United States Patent
Grey et al.

(10) Patent No.: US 7,613,954 B2
(45) Date of Patent: Nov. 3, 2009

(54) TEST EXECUTIVE WITH STACK CORRUPTION DETECTION

(75) Inventors: James A. Grey, Austin, TX (US); Erik Crank, Austin, TX (US)

(73) Assignee: National Instruments Corporation, Austin, TX (US)

( * ) Notice: Subject to any disclaimer, the term of this patent is extended or adjusted under 35 U.S.C. 154(b) by 538 days.

(21) Appl. No.: 11/107,337

(22) Filed: Apr. 15, 2005

(65) Prior Publication Data

US 2006/0143527 A1 Jun. 29, 2006

Related U.S. Application Data

(60) Provisional application No. 60/637,997, filed on Dec. 21, 2004.

(51) Int. Cl.
  *G06F 11/00* (2006.01)
(52) U.S. Cl. .......................................... 714/38; 714/54
(58) Field of Classification Search .................. 714/38, 714/42, 54
  See application file for complete search history.

(56) References Cited

U.S. PATENT DOCUMENTS

| | | | |
|---|---|---|---|
| 5,410,685 A | | 4/1995 | Banda et al. |
| 5,581,696 A | * | 12/1996 | Kolawa et al. ................ 714/38 |
| 5,583,988 A | | 12/1996 | Crank et al. |
| 5,590,329 A | | 12/1996 | Goodnow, II et al. |
| 5,615,369 A | * | 3/1997 | Holler ......................... 717/158 |
| 5,764,883 A | * | 6/1998 | Satterfield et al. ............. 714/38 |
| 5,822,517 A | * | 10/1998 | Dotan .......................... 726/22 |
| 6,085,029 A | * | 7/2000 | Kolawa et al. ................ 714/38 |
| 6,110,227 A | | 8/2000 | Marcelais et al. |
| 6,397,378 B1 | | 5/2002 | Grey et al. |
| 6,401,220 B1 | | 6/2002 | Grey et al. |
| 6,438,713 B1 | | 8/2002 | Taira et al. |
| 6,473,707 B1 | | 10/2002 | Grey |
| 6,507,842 B1 | | 1/2003 | Grey et al. |
| 6,523,097 B1 | * | 2/2003 | Liedtke et al. ............... 711/154 |
| 6,577,981 B1 | | 6/2003 | Grey et al. |
| 6,598,181 B1 | | 7/2003 | Pennell |
| 6,658,649 B1 | | 12/2003 | Bates et al. |
| 6,658,651 B2 | | 12/2003 | O'Brien et al. |
| 6,658,653 B1 | | 12/2003 | Bates et al. |
| 6,671,825 B1 | | 12/2003 | Joshi et al. |
| 6,675,379 B1 | | 1/2004 | Kolodner et al. |
| 6,718,485 B1 | * | 4/2004 | Reiser ......................... 714/38 |
| 6,754,850 B2 | | 6/2004 | Grey et al. |
| 6,795,890 B1 | * | 9/2004 | Sugai et al. ................. 711/103 |
| 6,829,733 B2 | | 12/2004 | Richardson et al. |

*Primary Examiner*—Robert Beausoliel
*Assistant Examiner*—Joshua P Lottich
(74) *Attorney, Agent, or Firm*—Meyertons Hood Kivlin Kowert & Goetzel, P.C.; Jeffrey C. Hood; Jason L. Burgess

(57) ABSTRACT

A system and method for detecting and/or preventing execution problems caused by user-supplied code modules that are called by steps of a test executive sequence. The test executive sequence may include a plurality of test executive steps. At least a subset of the steps may be configured to call user-supplied code modules. The test executive sequence may be executed on a host computer under control of a test executive engine. For each step that calls a user-supplied code module, the test executive engine may perform certain actions to detect and/or prevent execution problems caused by the user-supplied code module. For example, the test executive engine may be operable to automatically detect stack corruption caused by the user-supplied code module, may be operable to utilize stack safety buffers to avoid stack corruption problems caused by the user-supplied code module, and/or may include features for aiding a user in determining whether the user-supplied code module contains an uninitialized local variable.

72 Claims, 8 Drawing Sheets

U.S. PATENT DOCUMENTS

| | | |
|---|---|---|
| 6,845,470 B2 * | 1/2005 | Austen et al. .................. 714/38 |
| 6,868,508 B2 | 3/2005 | Grey |
| 6,907,557 B2 | 6/2005 | Perez et al. |
| 6,943,800 B2 * | 9/2005 | Taylor et al. ................. 345/543 |
| 6,971,084 B2 | 11/2005 | Grey et al. |
| 6,996,677 B2 * | 2/2006 | Lee et al. ..................... 711/132 |
| 7,089,335 B2 * | 8/2006 | Aiken et al. ................. 709/250 |
| 7,181,585 B2 * | 2/2007 | Abrashkevich et al. ...... 711/170 |
| 7,266,844 B2 * | 9/2007 | Teblyashkin et al. ........... 726/24 |
| 7,272,748 B1 * | 9/2007 | Conover et al. ............... 714/20 |
| 7,350,047 B2 * | 3/2008 | Dickenson ................... 711/170 |
| 7,373,408 B2 * | 5/2008 | Walls et al. .................. 709/227 |
| 7,376,941 B2 * | 5/2008 | Allen .......................... 717/157 |
| 7,380,245 B1 * | 5/2008 | Lovette ....................... 718/100 |
| 7,434,020 B2 * | 10/2008 | Swafford et al. ............. 711/170 |
| 2002/0122062 A1 | 9/2002 | Melamed et al. |
| 2002/0124042 A1 | 9/2002 | Melamed et al. |
| 2003/0046016 A1 | 3/2003 | Grey et al. |
| 2003/0046612 A1 | 3/2003 | Grey |
| 2003/0056069 A1 * | 3/2003 | Cabrera et al. .............. 711/161 |
| 2003/0069876 A1 | 4/2003 | Richardson |
| 2003/0145252 A1 | 7/2003 | Grey et al. |
| 2003/0145253 A1 * | 7/2003 | de Bonet ...................... 714/38 |
| 2003/0145280 A1 | 7/2003 | Grey et al. |
| 2003/0182601 A1 | 9/2003 | Richardson |
| 2004/0032423 A1 * | 2/2004 | Nason et al. ................. 345/746 |
| 2004/0093180 A1 | 5/2004 | Grey et al. |
| 2004/0098710 A1 * | 5/2004 | Radigan ...................... 717/144 |
| 2004/0113947 A1 | 6/2004 | Ramchandani |
| 2004/0143830 A1 | 7/2004 | Gupton et al. |
| 2004/0221120 A1 * | 11/2004 | Abrashkevich et al. ...... 711/170 |
| 2005/0235265 A1 * | 10/2005 | Allen .......................... 717/126 |
| 2006/0080520 A1 * | 4/2006 | Dickenson ................... 711/170 |
| 2006/0136876 A1 | 6/2006 | Melamed et al. |
| 2006/0143536 A1 | 6/2006 | Grey |
| 2006/0143537 A1 | 6/2006 | Grey |
| 2007/0038896 A1 * | 2/2007 | Champlin et al. .............. 714/38 |
| 2007/0136385 A1 * | 6/2007 | Abrashkevich et al. ...... 707/200 |
| 2007/0136565 A1 * | 6/2007 | Lambrache et al. ......... 712/244 |
| 2008/0133866 A1 * | 6/2008 | Dickenson ................... 711/170 |

* cited by examiner

| Step | Description | Execution Flow | Comment |
|---|---|---|---|
| Power On | Numeric Limit Test, 12 <= x <= 15, volt, Call P... | | |
| CPU | Call MainSequence in cpu.seq | | |
| ROM | Pass/Fail Test, Call ROMTest (computer.dll) | Precondition | |
| RAM | Pass/Fail Test, Call RAMTest (computer.dll) | Precondition | |
| Video | Numeric Limit Test, 70 <= x <= 75, hertz, Call ... | Precondition | |
| Keyboard | Pass/Fail Test, Call KeyboardTest (computer.dll) | Precondition | |
| ROM Diagnostics | Action, Call ROMDiagnostics (computer.dll) | Precondition | |
| RAM Diagnostics | Action, Call RAMDiagnostics (computer.dll) | Precondition | |
| Video Diagnostics | Action, Call VideoDiagnostics (computer.dll) | Precondition | |
| Keyboard Diagnostics | Action, Call KeyboardDiagnostics (computer.dll) | Precondition | |
| END | | | |

FIG. 4

TEST EXECUTIVE WITH STACK CORRUPTION DETECTION

PRIORITY CLAIM

This application claims benefit of priority of U.S. Provisional Application Ser. No. 60/637,997 titled "Test Executive with Features for Detecting and Preventing Errors in User-Supplied Code Modules Called by Steps of a Test Executive Sequence," filed Dec. 21, 2004, whose inventors were James A. Grey, Erik Crank, Douglas Melamed, and Scott Richardson.

FIELD OF THE INVENTION

The present invention relates to the field of test executive software for organizing and executing test executive sequences. In particular, on-e embodiment of the invention relates to a system and method for performing automatic stack corruption detection when user-supplied code modules are called by steps of a test executive sequence. Another embodiment of the invention relates to a system and method for utilizing stack safety buffers when user-supplied code modules are called by steps of a test executive sequence. Another embodiment of the invention relates to a system and method for increasing determinism for uninitialized local variable bugs in user-supplied code modules called by steps of a test executive sequence.

DESCRIPTION OF THE RELATED ART

Test executive software is specialized software that allows a user to create and execute test executive sequences to test units under test (UUTs). The test executive software operates as a control center for an automated test system. More specifically, the test executive software allows the user to create, configure, and control execution of test executive sequences for various test applications, such as production and manufacturing test applications. Text executive software typically includes various features such as test sequencing based on pass/fail results, logging of test results, and test report generation, among others.

A test executive sequence may include a plurality of steps, and one or more of the steps may call user-supplied code modules, also referred to herein as test modules. As used herein, a user-supplied code module or test module refers to a software module that is written or supplied by a user of the test executive software. The user may construct various test modules designed to perform tests on a UUT, and execution of these test modules may be invoked by steps in a test executive sequence when the sequence is executed. For example, the test modules may interact with one or more hardware instruments to test the UUT(s).

The test executive software typically includes a sequence editor for creating test executive sequences and a test executive engine operable to execute the test executive sequences. Executing a test executive sequence may comprise executing each of the steps in the test executive sequence, e.g., executing each of the steps according to an order defined by the test executive sequence.

For each step in the test executive sequence that calls a user-supplied code module, executing the step may comprise both executing program instructions of the test executive engine and executing the user-supplied code module. For example, in addition to calling a user-supplied code module, a step in a test executive sequence may also perform additional functionality, where the additional functionality is implemented by the test executive engine and not coded by the user. For example, the step may be operable to perform common functionality which is useful for various automated test applications, where the common functionality is implemented by the test executive engine. This may remove the burden on the user from implementing this functionality for the step, thus increasing the user's ease and efficiency of creating the automated test system.

As one example, the test executive engine may implement automatic result collection for a step in a test executive sequence. For example, when the step is executed during execution of the test executive sequence, the test executive engine may first invoke execution of a user-supplied code module called by the step. The user-supplied code module may execute to perform a specific test of a UUT. The user-supplied code module may conform to a programming interface through which its execution results can be passed back to the test executive engine. When the user-supplied code module finishes execution, the test executive engine may be operable to automatically receive the execution results of the module and log them in a report file or database. Thus, in this example, the user may implement the specific test functionality performed by the user-supplied code module but may not be required to implement the functionality of logging the execution results of the user-supplied code module since the logging is performed automatically by the test executive engine.

In some instances a test executive sequence may also include one or more steps that do not call user-supplied code modules. For example, the functionality of some steps may be implemented entirely by the test executive engine and may not be coded by the user. However, the test executive software, e.g., the sequence editor, may allow the user to set various properties or parameters affecting operation of the steps, e.g., by interacting with a dialog box or other graphical user interface associated with the steps.

Bugs or errors in user-supplied code modules may cause a test executive sequence to crash when it is executed or to exhibit other problematic behavior. Because test executive sequence execution involves executing both program instructions of the test executive engine and program instructions of user-supplied code modules, it can be difficult for users to determine the source of the error. For example, memory corruption caused by a user-supplied code module can lead to a crash or odd behavior that happens long after the user-supplied code module finishes execution.

The symptoms of problems caused by bugs in user-supplied code modules can be intermittent, difficult to reproduce, and subject to changing or to temporarily disappearing when anything about the system is modified, including modifications intended to help diagnose the problem. Because of this lack of repeatability, these types of bugs are among the most difficult to resolve. They are often referred to as "Heisenbugs", because any attempt to narrow down the problem can change the problem symptoms, somewhat analogous to how any attempt to more accurately determine the location of an electron only makes its momentum more uncertain (from the Heisenberg uncertainty principle).

These type of bugs also have an additional problem in that when they occur due to user-supplied code that is run within the test executive engine's process space, a resulting crash in the test executive application can be interpreted by the user as a vendor bug. This can distract the user from focusing on where the problem is really located and can create a mistaken bad impression of the vendor's test executive application.

One common type of error that can be caused by user-supplied code modules is stack corruption. The term "stack"

is intended to have the full breadth of its ordinary meaning in the computer programming art. For example, a stack may refer to an area of memory in which data is stored in a last-in first-out (LIFO) manner. Different conventions are used to conceptualize stack usage. For example, stacks are sometimes conceptualized as growing "upward" as data is added to the stack. That is, new data is said to be placed "on top" of older data on the stack, and a stack pointer is used to represent the current top of the stack. In another convention, which is the convention used in the present application, stacks are conceptualized as growing "downward" as data is added to the stack. That is, new data items are added at the "bottom" of the stack, and a stack pointer is used to represent the current bottom of the stack. Thus, the stack pointer is (conceptually) pushed or moved downward as new data is added to the stack. Thus, as used herein, a "stack pointer" for a stack may refer to information specifying a location or address of the last (newest) data item on the stack.

Stacks may be used in various ways to manage or track the execution of computer programs. For example, a stack may be used to keep track of the invocation chain of functions or other routines during program execution. For example, when a function call is performed, the parameter or argument values specified in the function call may be pushed onto the bottom of the stack, and the function may then be invoked. Depending on the particular programming language, execution environment, and/or computer hardware, other data may also be pushed onto the stack, such as a return address of the calling function, or separate stacks may be used to represent different kinds of data. Thus, as a chain of functions or other routines are invoked, the stack pointer may be pushed downward. As each function returns, the stack pointer may move back up, e.g., to the location where it was before the function was called.

In some programming languages or execution systems, a stack may also be used for storage of variables used in a function. For example, when a function is invoked, the function may receive its parameter values on the stack, as described above. Local variables that are used in the function may then be allocated on the stack, thus pushing the stack pointer further downward. A portion of data on the stack that is associated with a particular function invocation (e.g., the parameter values that were passed to the function, local variables used by the function, and possibly other data associated with the function invocation) may be referred to as a "stack frame".

As described above, executing a test executive sequence may involve executing both program instructions of the test executive engine and program instructions of user-supplied code modules that are called by steps of the test executive sequence. In some test executive systems, the user-supplied code modules and the test executive engine may share a common stack. For example, when a user-supplied code module is called, a new stack frame, which may include parameters for the user-supplied code module and possibly other data, may be added at the bottom of the stack, as described above. Higher stack frames may contain data for the test executive engine, e.g., may contain parameter values and local variables used by various functions or routines of the test executive engine.

A user-supplied code module can corrupt the stack by writing into portions of the stack which it is not supposed to write into. For example, if the user-supplied code module contains a bug that causes it to write into memory locations outside its own stack frame then it may corrupt data in stack frames of the test executive engine. This may cause a crash or other problem when executing the test executive sequence, as described above.

In some situations it is possible for the user-supplied code module to corrupt stack data for the test executive engine even if the user-supplied code module does not contain a bug per se. For example, when the user configures a step in the test executive sequence to call a user-supplied code module, the user may specify a prototype for the user-supplied code module. The prototype may specify a signature or calling interface for the user-supplied code module, such as the number of parameters to pass to the module and the data types and order for the parameters. If the user specifies an incorrect prototype for the user-supplied code module (i.e., if the specified prototype does not match the actual prototype for the user-supplied code module), or if the actual prototype for the user-supplied code module changes later then the test executive engine may not be able to pass the correct parameters to the user-supplied code module, i.e., may not pass the parameters that the user-supplied code module expects. For example, if the user-supplied code module expects to receive a buffer parameter on the stack and the test executive engine does not pass the buffer because the buffer parameter was not specified in the prototype which the user provided for the user-supplied code module, then the user-supplied code module may corrupt data in a higher stack frame when it attempts to write into the buffer.

User-supplied code modules may also contain various other types of bugs. For example, user-supplied code modules often have uninitialized local variable bugs. If the user-supplied code module attempts to use a local variable whose value has not yet been initialized then the variable may contain random data, which may cause the user-supplied code module to crash or function incorrectly, or in some cases may cause the user-supplied code module to corrupt data belonging to the test executive engine.

SUMMARY

One embodiment of the invention comprises a system and method for automatically detecting stack corruption errors caused by user-supplied code modules that are called by steps of a test executive sequence. The test executive sequence may first be created by including a plurality of test executive steps in the test executive sequence and configuring at least a subset of the steps to call user-supplied code modules. For example, a user may interact with a sequence editor which provides a graphical user interface for creating and configuring the test executive sequence.

The test executive sequence may then be executed on a host computer, e.g., may be executed under control of a test executive engine. Executing the test executive sequence may comprise the test executive engine executing each of the steps in the test executive sequence. In one embodiment a step may have "pre-functionality" that is implemented by the test executive engine, i.e., functionality to be performed before a user-supplied code module called by the step is executed. Thus, for each step in the test executive sequence that has pre-functionality, executing the step may include the test executive engine executing the pre-functionality of the step.

As discussed above, in one embodiment the test executive engine and the user-supplied code modules that are called by steps of the test executive sequence may share a common stack during execution of the test executive sequence. A user-supplied code module can corrupt the stack by writing into portions of the stack that it is not supposed to write into. For example, if a user-supplied code module called by a step in the test executive sequence contains a bug that causes it to write into memory locations outside its own stack frame then it may corrupt data in stack frames of the test executive engine. In one embodiment the test executive engine may be operable to automatically detect a stack corruption error caused by a user-supplied code module called by a step in the test executive sequence.

Before invoking execution of the user-supplied code module called by the step, the test executive engine may store a portion of the stack ranging from an initial location to the current stack pointer location. The portion of the stack which is stored may later be checked for corruption after the user-supplied code module called by the step has executed, as described below. In various embodiments, the portion of the stack may be stored in any of various locations or types of memory. In one embodiment the portion of the stack may be stored in a heap. For example, a block of memory may be dynamically allocated from the heap, and contents of the portion of the stack may be written into the allocated memory block. In another embodiment the portion of the stack may be stored on non-volatile memory, e.g., on a hard drive.

The test executive engine may also copy parameters for the user-supplied code module called by the step (if the module takes any parameters) onto the stack before invoking execution of the user-supplied code module called by the step. However, since the user-supplied code module may legitimately modify or write into its own parameters, the parameters may not be stored along with the stack portion that is stored.

The test executive engine may then invoke execution of the user-supplied code module called by the step. After the user-supplied code module finishes executing, the test executive engine may check the portion of the stack that was previously stored against current contents of the actual stack to determine whether any contents in the portion of the stack were changed during execution of the user-supplied code module. In other words, current contents of the actual stack may be checked against the contents that were previously stored, where the range of locations checked is the same range which was previously stored. If the user-supplied code module did not write into a higher stack frame outside its own stack frame then the test executive engine should find that the stored contents are the same as the actual current contents for the range of the stack that is checked, i.e., should find that the stack has not been corrupted. However, if any stack contents within the checked range were changed then the stack was corrupted.

In another embodiment, instead of storing actual stack contents before invoking execution of the user-supplied code module called by the step, the test executive engine may store a checksum based on contents of a portion of the stack. After the user-supplied code module finishes executing, the test executive engine may use the checksum to verify that the stack portion was not altered, e.g., by computing a new checksum based on the current contents of the same stack portion and verifying that the new checksum is the same as the stored checksum. A difference in the checksums may indicate that the stack was corrupted by the user-supplied code module. This embodiment may enable the test executive sequence to execute faster and may require less memory since actual stack contents are not stored. However, in the event that the test executive engine determines that the stack was corrupted, the test executive engine may not be able to provide the user with details regarding the stack corruption, such as the specific memory location(s) that was corrupted or the contents of the corrupted location(s).

If the test executive engine finds that the stack was corrupted then the test executive engine may be operable to report an error in response. In one embodiment the test executive engine may stop execution of the test executive sequence and may display information on the display of the host computer indicating that the user-supplied code module caused the stack to become corrupted. In one embodiment the test executive engine may also display details regarding the stack corruption, such as the specific memory location(s) that was corrupted or the contents of the corrupted location(s). In another embodiment the test executive engine may continue executing the test executive sequence but may log the error, e.g., may log the error in a test results report for the test executive sequence, in a file, or in a database, etc.

In one embodiment a step may have "post-functionality" that is implemented by the test executive engine, i.e., functionality to be performed after a user-supplied code module called by the step is executed. Thus the test executive engine may also execute the post-functionality of the step after the user-supplied code module called by the step finishes execution.

Another embodiment of the invention comprises a system and method for utilizing stack safety buffers, e.g., to avoid stack corruption problems caused by user-supplied code modules that are called by steps of a test executive sequence. A test executive sequence may first be created, similarly as described above. After the test executive sequence has been created, the test executive sequence may be executed on a host computer under control of a test executive engine, similarly as described above.

Executing the test executive sequence may comprise the test executive engine executing each of the steps in the test executive sequence. In one embodiment a step may have "pre-functionality" that is implemented by the test executive engine, i.e., functionality to be performed before a user-supplied code module called by the step is executed. Thus, for each step in the test executive sequence that has pre-functionality, executing the step may comprise the test executive engine executing the pre-functionality of the step.

Before invoking execution of the user-supplied code module called by the step, the test executive engine may allocate or reserve a safety buffer on the stack. The safety buffer may simply comprise a portion of the stack that contains no functional information and is not intended to be used. For example, the test executive engine may simply cause the stack pointer to be moved downward to reflect the allocation of the safety buffer. As described below, if the user-supplied code module called by the step writes beyond the bounds of its parameters on the stack then the safety buffer may be overwritten. Overwriting the safety buffer, which contains no important information, is preferable to overwriting important information on the stack.

In one embodiment the test executive engine may initialize the safety buffer so that each bit in the safety buffer is set to an initial value. Initializing the safety buffer may enable the test executive engine to check whether any bit in the safety buffer was overwritten by the user-supplied code module after the user-supplied code module finishes execution.

The test executive engine may also copy or allocate one or more parameters for the user-supplied code module called by the step onto the stack after allocating and possibly initializing the safety buffer. Thus, the safety buffer may lie between stack data for the test executive engine and the parameters for the user-supplied code module. The test executive engine may utilize a prototype specified by the user for the user-supplied code module to determine what parameters to copy onto the stack, e.g., to determine the number of parameters, their sizes, etc.

The test executive engine may then invoke execution of the user-supplied code module called by the step. The user-supplied code module may execute to perform any functionality and may possibly write into one or more of its parameters on the stack. It is possible that there is a mismatch between the parameters actually expected by the user-supplied code module and the parameters that are passed to the user-supplied code module on the stack by the test executive engine. For example, the test executive engine may pass one or more parameters to the user-supplied code module based on the prototype specified by the user for the user-supplied code module when the test executive sequence was configured, but the specified prototype may not match the user-supplied code module's actual prototype, e.g., due to an error by the user in specifying the prototype or due to a subsequent change in the user-supplied code module. Such a mismatch may cause the user-supplied code module to write beyond the bounds of its parameters on the stack. It is also possible the user-supplied code module contains a bug which causes it to write beyond the bounds of its parameters on the stack. If the user-supplied code module writes beyond the bounds of its parameters on the stack then the safety buffer may be overwritten instead of important stack data, as described above.

In one embodiment the test executive engine may check the safety buffer after the user-supplied code module called by the step finishes executing to determine whether each bit in the safety buffer is still set to the initial value to which it was initialized. If the user-supplied code module did not write into the safety buffer then the test executive engine should find that no bit in the safety buffer was changed from when it was initialized.

If the test executive engine finds that the safety buffer was changed by the user-supplied code module then the test executive engine may be operable to report an error in response. In one embodiment the test executive engine may stop execution of the test executive sequence and may display information on the display of the host computer indicating that the user-supplied code module wrote beyond the bounds of its parameters on the stack. In another embodiment the test executive engine may continue executing the test executive sequence but may log the error, e.g., may log the error in a test results report for the test executive sequence, in a file, or in a database, etc.

In one embodiment the step may have "post-functionality" that is implemented by the test executive engine, i.e., functionality to be performed after the user-supplied code module called by the step is executed. Thus, the test executive engine may also execute the post-functionality of the step after the user-supplied code module called by the step finishes execution.

In an alternative embodiment of the method, the safety buffer may not be initialized or checked for changes after the user-supplied code module called by the step finishes execution. Thus, if the user-supplied code module writes beyond the bounds of its parameters into the safety buffer then this may not be detected by the test executive engine. However, the presence of the safety buffer on the stack may still prevent the overwrite from causing a crash or other serious problem when executing the test executive sequence.

Another embodiment of the invention comprises a system and method for aiding users in determining whether user-supplied code modules called by steps of a test executive sequence contain uninitialized local variable bugs. A test executive sequence may first be created, similarly as described above. After the test executive sequence has been created, the test executive sequence may be executed on a host computer under control of a test executive engine, similarly as described above.

Executing the test executive sequence may comprise the test executive engine executing each of the steps in the test executive sequence. In one embodiment a step may have "pre-functionality" that is implemented by the test executive engine, i.e., functionality to be performed before a user-supplied code module called by the step is executed. Thus, for each step in the test executive sequence that has pre-functionality, executing the step may comprise the test executive engine executing the pre-functionality of the step.

Before invoking execution of the user-supplied code module called by the step, the test executive engine may initialize at least a portion of unused space on the stack so that each bit in the portion is set to an initial value. When the user-supplied code module called by the step is subsequently executed, the user-supplied code module may utilize one or more local variables. These local variables may be stored on the stack within the portion of the stack that was initialized by the test executive engine.

The test executive engine may then invoke execution of the user-supplied code module called by the step. The user-supplied code module may execute to perform any functionality and may possibly use one or more local variables that are stored on the portion of the stack that was initialized by the test executive engine.

As described above, in one embodiment the step may have "post-functionality" that is implemented by the test executive engine, i.e., functionality to be performed after the user-supplied code module called by the step is executed. After the user-supplied code module finishes execution, the test executive engine may execute the post-functionality of the step.

Where a user-supplied code module called by a step of the test executive sequence has an uninitialized local variable, the above-described method may cause the user-supplied code module to behave consistently by filling the local variable with a known value, which may greatly decrease the user's debugging effort. In one embodiment the user may be able to specify a value to which to initialize the portion of unused stack space. The user may be able to vary the initialization value or fill pattern to check the effect that this has on the execution of the user-supplied code module. This may help the user to debug the user-supplied code module.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a sequence editor;

Figure 1:
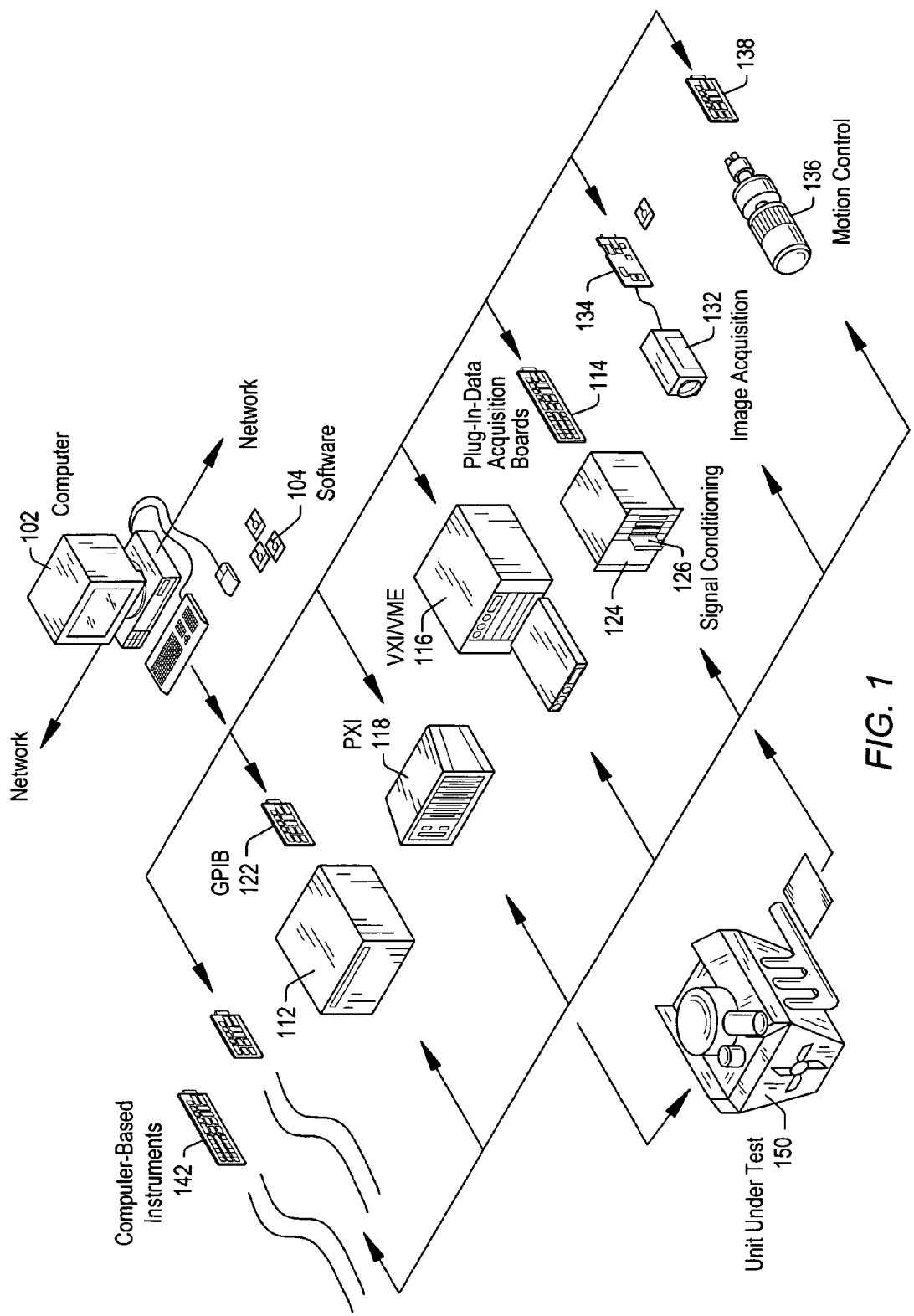
FIG. 1 illustrates an exemplary automated test system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein.

U.S. Pat. No. 6,401,220 titled "Test Executive System and Method Including Step Types for Improved Configurability," issued Jun. 4, 2002.

U.S. patent application Ser. No. 09/944,546 titled "System and Method Enabling Execution Stop and Restart of a Test Executive Sequence(s)," filed Aug. 31, 2001.

U.S. patent application Ser. No. 10/056,853 titled "Test Executive System Having XML Reporting Capabilities," filed Jan. 25, 2002.

Terms

The following is a glossary of terms used in the present application:

User-Supplied Code Module—A software module or component written by a user. A user-supplied code module may be constructed or packaged in any of various ways and may be created using any of various programming tools or application development environments. For example, a user-supplied code module may be implemented as a function in a Windows Dynamic Link Library (DLL), a LabVIEW graphical program (VI), an ActiveX component, a Java component, or other type of program module or component that implements a specific test or other functionality.

Test Module—A user-supplied code module that performs a test of a UUT.

Test Executive Step—An action that the user can include within a test executive sequence. A step may call a user-supplied code module, e.g., may call a test module to perform a specific test of a UUT. The step may have properties or parameters that can be set by the user, e.g., through a dialog box or other graphical user interface. In addition to calling a user-supplied code module, a step may also have built-in functionality implemented by the test executive software.

Step Module—The user-supplied code module that a test executive step calls.

Test Executive Sequence—A plurality of test executive steps that the user specifies for execution in a particular order. Whether and when a step is executed can depend on the results of previous steps. A test executive sequence may be created using a sequence editor. For example, the sequence editor may create a sequence file or other data structure representing the test executive sequence. A test executive sequence may be executed by a test executive engine.

Sequence File—A file that contains the definition of one or more test executive sequences.

Sequence Editor—A program that provides a graphical user interface for creating, editing, and debugging sequences. One embodiment of a sequence editor is described in detail below.

Test Executive Engine—A program operable to execute a test executive sequence. One embodiment of a test executive engine is described in detail below.

Run-time Operator Interface Application—An application program that provides a graphical user interface for controlling execution of test executive sequences, e.g., on a production station. For example, the graphical user interface of the run-time operator interface application may allow a test operator to start and stop execution of the test executive sequences. A sequence editor and run-time operator interface application can be separate programs or different aspects of the same program. The test executive engine may provide an application programming interface (API) which the run-time operator interface application calls to control execution of the test executive sequences.

Application Development Environment (ADE)—A programming environment such as LabVIEW, LabWindows/CVI, Microsoft Visual C++, Microsoft Visual Basic, etc., in which a user can create user-supplied code modules and run-time operator interface applications.

Unit Under Test (UUT)—A physical device or component that is being tested.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "graphical user interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window, panel, or dialog box having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements include input controls and output indicators Input Control—a graphical user interface element for providing user input to a program. Exemplary input controls include buttons, check boxes, input text boxes, knobs, sliders, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data from a UUT. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Instrumentation System

FIG. 1 illustrates an exemplary automated test system 100, according to one embodiment. It is noted that FIG. 1 is exemplary only, and the present invention may be used in conjunction with any of various systems, as desired. The system 100 comprises a host computer 102 that connects to one or more instruments. The host computer 102 comprises a CPU, a display screen, memory, and one or more input devices such as a mouse or keyboard as shown.

The computer 102 may execute a test executive sequence operable to analyze, measure, control, or otherwise test a unit under test (UUT) or process 150. For example, the test executive sequence may include various steps that invoke software test modules operable to connect through the one or more instruments to analyze, measure, or control the unit under test (UUT) or process 150. The software test modules that are invoked or called by the steps in the test executive sequence may comprise user-supplied code modules. In other words, the test modules may be written or supplied by a user of the test executive software.

The test executive software may include a test executive engine 220 operable to execute the test executive sequence. As described above, errors in user-supplied code modules that are called by steps in the test executive sequence may cause the test executive sequence to crash when it is executed or to exhibit other problematic behavior. One common type of error that can be caused by user-supplied code modules is stack corruption. In one embodiment the test executive software, e.g., the test executive engine 220, may be operable to automatically detect stack corruption caused by a user-supplied code module during execution of a test executive sequence, as described in detail below.

As described above, the test executive sequence may also crash when it is executed or may exhibit other problematic behavior if a prototype that a user specifies for a user-supplied code module called by a step in the test executive sequence does not match the actual prototype of the module. For example, the prototype mismatch may cause the user-supplied code module to corrupt stack data for the test executive engine, as described above. In one embodiment the test executive software, e.g., the test executive engine 220, may be operable to utilize stack safety buffers to avoid stack corruption problems caused by prototype mismatches for user-supplied code modules, as described in detail below.

As described above, another common problem associated with user-supplied code modules is the presence of uninitialized local variable bugs. In one embodiment the test executive software, e.g., the test executive engine 220, may include features for aiding users in determining whether user-supplied code modules called by steps of a test executive sequence contain uninitialized local variables, as described in detail below.

Referring again to FIG. 1, the one or more instruments of the automated test system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 may include an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the automated test system 100, as desired.

The computer 102 may include or may access a memory medium on which test executive software is stored. For example, the test executive software may include a test executive engine 220 which is operable to execute test executive sequences. The test executive software may also include components operable to create and configure test executive sequences, as described below. For example, the memory medium may store a sequence editor 212 such as described below. In one embodiment the memory medium may also store one or more test executive sequences to be executed on the computer 102, as well as possibly storing one or more user-supplied code modules called by steps in the test executive sequences. In one embodiment, one or more of the software elements described above may be included on remote computer systems.

Figure 2:
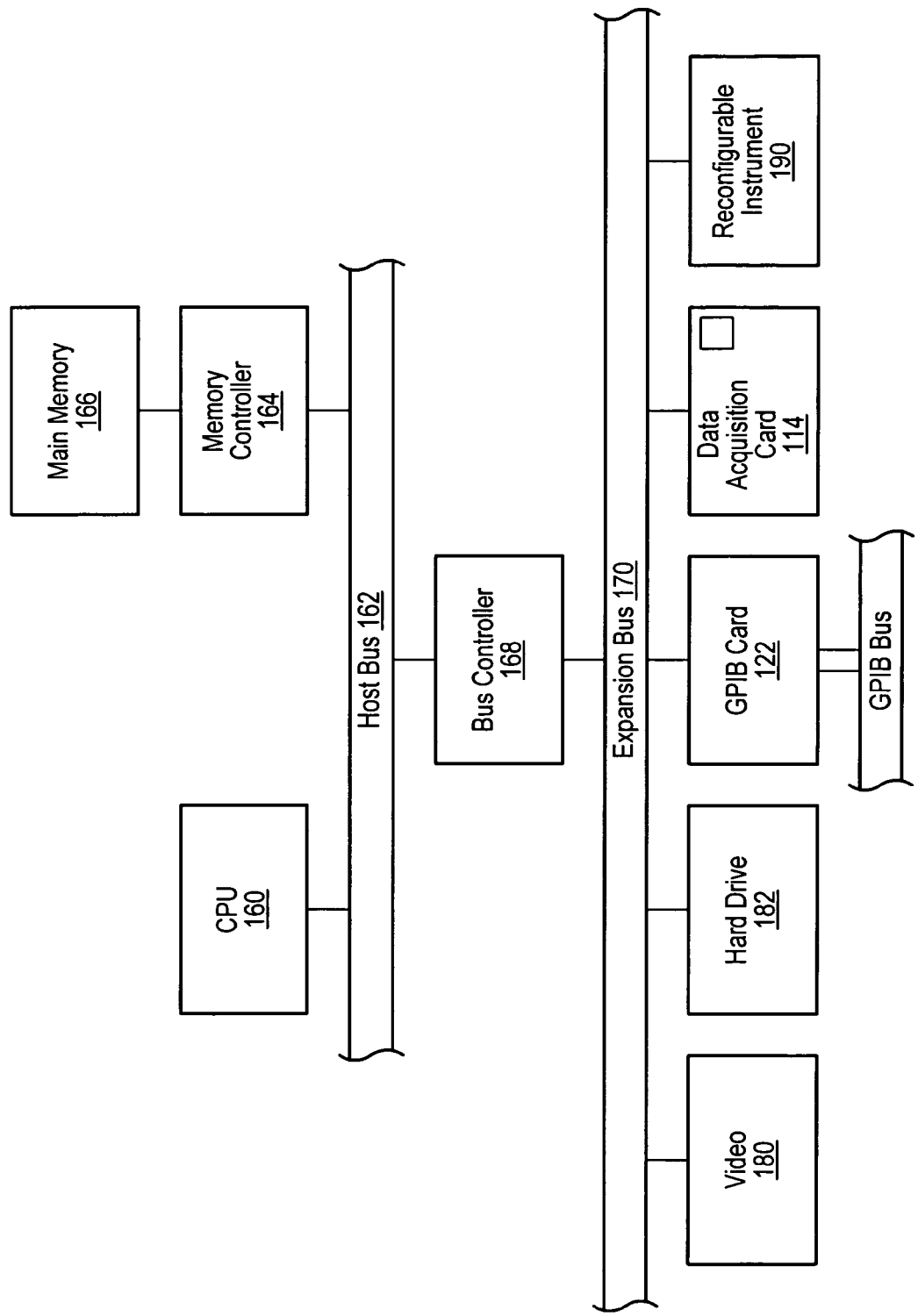
FIG. 2 is a diagram representing one embodiment of the computer system illustrated in FIG. 1.

FIG. 2—Computer System Block Diagram

FIG. 2 is a diagram of the computer system 102 illustrated in FIG. 1, according to one embodiment. It is noted that any type of computer system configuration or architecture can be used as desired, and FIG. 2 illustrates a representative PC embodiment. It is also noted that the computer system 102 may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

In the illustrated embodiment, the computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software such as the software elements described above with reference to FIG. 1. The main memory 166 may also store operating system software as well as other software for operation of the computer system, as well known to those skilled in the art. The CPU 160 executing code and data from the main memory 166 may comprise a means for implementing the methods described below.

The host bus 162 is coupled to an expansion or input/output bus 170 by means of a bus controller 168 or bus bridge logic. The expansion bus 170 may be the PCI (Peripheral Component Interconnect) expansion bus, although other bus types can also be used. The expansion bus 170 may include slots for various devices such as the data acquisition board 114 (of FIG. 1) and a GPIB interface card 122 that provides a GPIB bus interface to the GPIB instrument 112 (of FIG. 1). A video display subsystem 180 and hard drive 182 coupled to the expansion bus 170 is also shown.

In one embodiment, a reconfigurable instrument 190 may also be connected to the computer 102. The reconfigurable instrument 190 may include a functional unit, also referred to as configurable logic, such as a programmable logic element, e.g., an FPGA, or a processor and memory, which may execute a real time operating system. Program instructions may be downloaded and executed on the reconfigurable instrument 190. In one embodiment, at least a portion of the software described herein may execute on the reconfigurable instrument 190. In various embodiments, the functional unit may be included on an instrument or device connected to the computer through means other than an expansion slot, e.g., the instrument or device may be connected via an IEEE 1394 bus, USB, or other type of port. Also, the functional unit may be included on a device such as the data acquisition board 114 or another device shown in FIG. 1.

Test Executive Software Components

Figure 3:
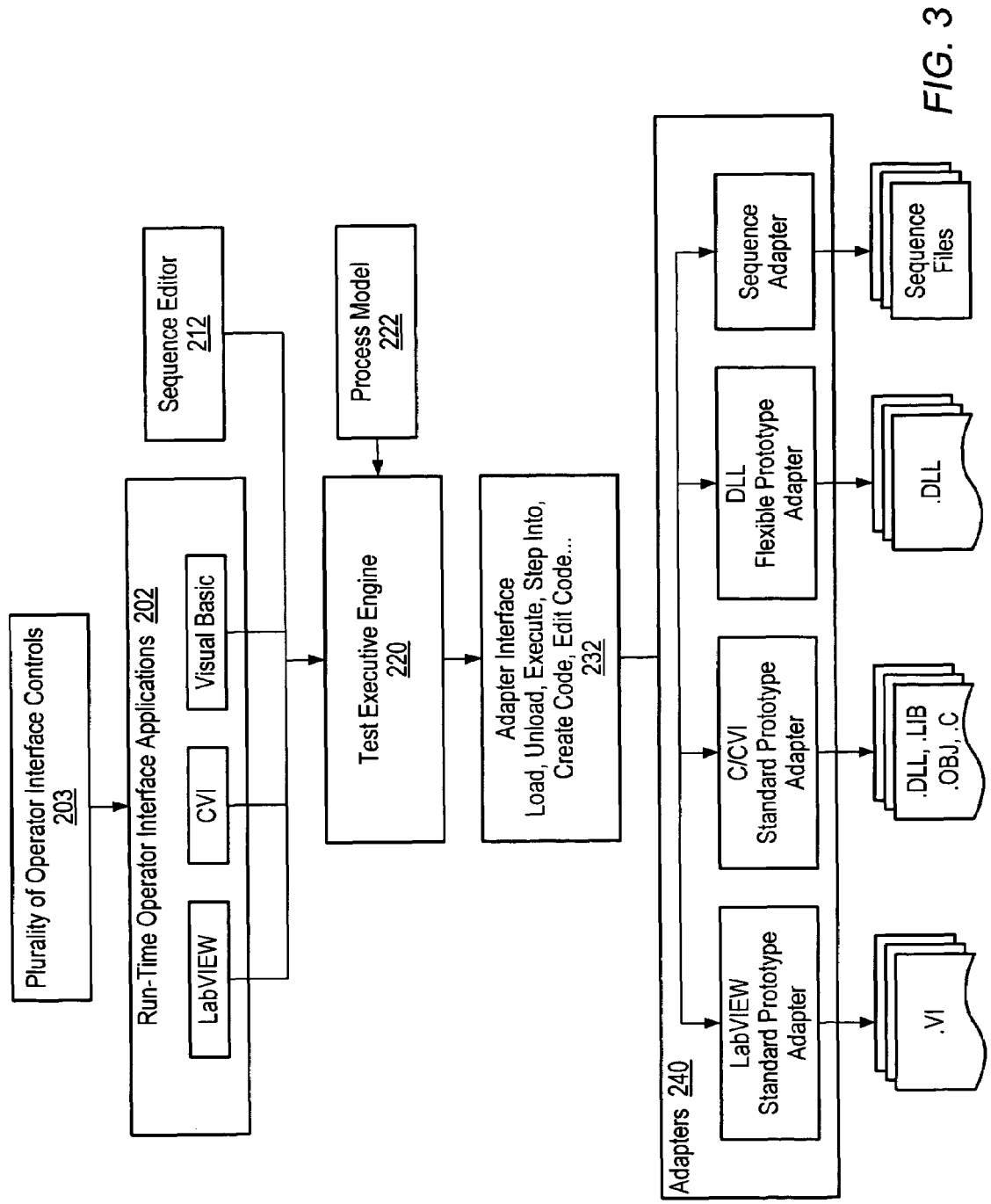
FIG. 3 is a diagram illustrating high-level architectural relationships between elements of a test executive software application according to one embodiment.

FIG. 3 is a block diagram illustrating high-level architectural relationships between elements of a test executive software application according to one embodiment. It is noted that FIG. 3 is exemplary, and in other embodiments the test executive software may have different architectures.

In the embodiment illustrated in FIG. 3, the test executive software includes a sequence editor 212 for creating and editing test executive sequences. The sequence editor 212 may interface to a test executive engine 220. In one embodiment, one or more process models 222 may couple to the test executive engine 220. The test executive engine 220 may interface through an adapter interface 232 to one or more adapters 240. The adapters 240 shown in FIG. 3 include a LabVIEW standard prototype adapter, a C/CVI prototype adapter, a DLL flexible prototype adapter, and a sequence adapter. The LabVIEW standard prototype adapter may interface to user-supplied code modules having a .VI extension, i.e., LabVIEW graphical programs. The C/CVI prototype adapter may interface to user-supplied code modules having a .dll, .lib, .obj, or .c extension. The DLL flexible prototype adapter may interface to user-supplied code modules having a .dll extension. The sequence adapter may interface to sequence files.

The test executive engine 220 may manage the execution of test executive sequences. Test executive sequences include test executive steps that may call external or user-supplied code modules. By using module adapters 240 that have the standard adapter interface 232, the test executive engine 220 may invoke execution of different types of user-supplied code modules. Thus, the test executive may be independent from particular application development environments (ADEs) used to create the user-supplied code modules. In one embodiment, the test executive may use a special type of sequence called a process model to direct the high-level sequence flow. The test executive engine 220 may implement an application programming interface (API) used by the sequence editor 212 and run-time operator interfaces 202.

Sequence Editor

The sequence editor 212 may comprise a program in which the user creates, edits, and/or debugs test executive sequences. The sequence editor 212 may have a graphical user interface (GUI) enabling a user to efficiently create a test executive sequence for testing a physical system or unit under test. The graphical user interface of the sequence editor 212 may enable the user to request or select steps to be added to a test executive sequence and configure the steps. The graphical user interface may provide the user with easy access to test executive features, such as step types, step properties, sequence parameters, step result collection, etc.

FIG. 4 illustrates one example of a test executive sequence, created according to one embodiment of a sequence editor 212. The exemplary test executive sequence of FIG. 4 includes a plurality of test executive steps that call user-supplied code modules operable to test various aspects of a computer system under test. For example, the sequence includes a "ROM" step that calls a user-supplied code module to test the computer's read-only memory, a "RAM" step that calls a user-supplied code module to test the computer's random access memory, etc. Each user-supplied code module called by a step in the test executive sequence may interact with one or more hardware devices or instruments that interface with the computer system under test to perform the desired test.

Figure 5:
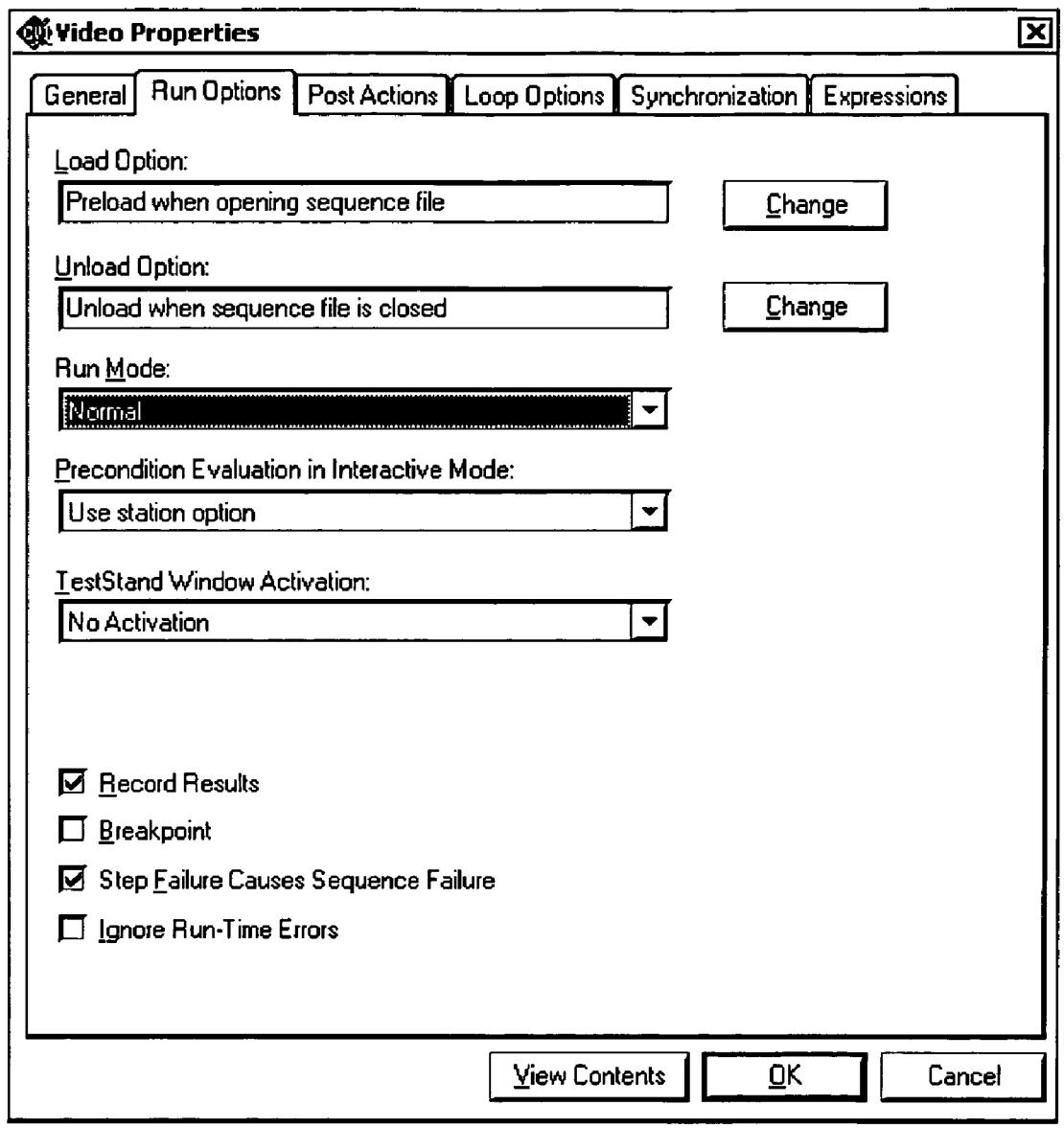
FIG. 5 illustrates an exemplary GUI panel for a test executive step, which enables the user to specify various properties for the step that affect the way the test executive engine manages the execution of the step.

The user may be able to set various properties or parameters for each step that affect the way the test executive engine 220 manages the execution of the step. For example, the sequence editor 212 may provide a dialog box or other graphical user interface for each step with which the user may interact to specify the properties or parameters for the step. For example, FIG. 5 illustrates an exemplary dialog box for the "Video" step of the test executive sequence of FIG. 4. As shown, a "Run Options" property page is selected in FIG. 5. The "Run Options" property page enables the user to specify various options for the step, such as whether to collect test results for the step, whether to break execution when the step is reached, whether to pre-load the step when opening the sequence file, etc. Other property pages in the dialog box of FIG. 5, such as the "General", "Post Actions", "Loop Options", "Synchronization", and "Expressions" pages, enable the user to specify other options or properties for the step. For example, the user may provide input to the "General" page to specify a user-supplied code module for the step to call, e.g., by selecting a file (and possibly a module or function within the file) representing the user-supplied code module.

As described in detail below, in various embodiments the test executive engine 220 may include features for detecting and/or avoiding various types of bugs associated with user-supplied code modules that are called by steps of a test executive sequence, such as stack corruption bugs and uninitialized local variable bugs. In one embodiment the sequence editor 212 may provide a graphical user interface for setting various properties related to the detection and/or avoidance of these bugs. In one embodiment, the sequence editor 212 may allow the user to specify global options related to the entire test executive sequence. As one example, the sequence editor 212 may allow the user to specify whether automatic stack corruption detection is enabled or disabled for the sequence, or whether the use of stack safety buffers is enabled or disabled for the sequence, or whether stack initialization for aiding in detecting uninitialized local variable bugs is enabled or disabled for the sequence. In another embodiment, the sequence editor 212 may allow the user to specify options related to specific steps in the test executive sequence. For example, the sequence editor 212 may allow the user to specify whether the above-mentioned features are enabled or disabled for a specific step in the test executive sequence.

In addition to specifying whether the above-mentioned features are enabled or disabled, the graphical user interface of the sequence editor 212 may also allow the user to specify other properties or parameters that affect the operation of the features. As one example, the sequence editor 212 may allow the user to specify a size, e.g., a number of bytes, for stack safety buffers. Operation of the above-mentioned features for detecting and/or avoiding bugs associated with user-supplied code modules is described in detail below.

In one embodiment, the sequence editor 212 may also include an execution window that provides debugging tools for debugging test executive sequences. For example, the test executive application may provide debugging features such as breakpoints, single stepping, tracing, a variable display, and a watch window.

Test Executive Engine

The test executive engine 220 may be used when executing and debugging test executive sequences. The test executive engine 220 may also provide a test executive engine application programming interface (API) that enables another program to interface with the test executive engine 220 in order to perform these actions. For example, a run-time operator interface application may request the test executive engine 220 to execute a test executive sequence, stop execution of the test executive sequence, etc.

In one embodiment, the test executive engine 220 may export an object-based or component-based API, which in one embodiment may be an ActiveX Automation API. The sequence editor 212 and run-time operator interface applications 202 may call the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from run-time operator interface applications 202 or test modules written in various programming environments, including those that are written in LabVIEW, LabWindows/CVI, Microsoft Visual C++, Microsoft Visual Basic, Java, etc.

One task performed by the test executive engine 220 is to manage the execution of test executive sequences. Executing a test executive sequence may comprise executing steps included in the test executive sequence. Not all steps in the test executive sequence are necessarily executed. For example, the user may configure some steps to be skipped, e.g., depending on execution results of previous steps.

For a step that calls a user-supplied code module, executing the step may comprise invoking execution of the respective code module. As described above, the user-supplied code module may be constructed in various ways, using any of various kinds of programming languages or application development environments. The user-supplied code module may execute independently from the test executive engine 220 and may possibly be executed under control of its own execution environment or subsystem.

In addition to these user-supplied code modules being executed, for each step, additional program instructions may be executed, wherein these additional program instructions are implemented by the test executive engine 220 itself and provide additional functionality for the step. In other words, these additional program instructions may be program instructions of the test executive software, e.g., program instructions of the test executive engine 220, rather than being defined by the user. As one example, when including a step in a test executive sequence, the user may configure execution results of the step to be collected. In this example, when the step is executed, test executive engine 220 program instructions operable to store the step results accordingly may be executed in addition to the program instructions of a user-supplied code module that the step references.

In some instances, the additional program instructions that are implemented by the test executive engine 220 may be executed before a user-supplied code module called by the step is invoked. In this case, the functionality that is performed before the user-supplied code module is invoked may be referred to as "pre-functionality". In other instances, the additional program instructions that are implemented by the test executive engine 220 may be executed after the user-supplied code module called by the step finishes execution. In this case, the functionality that is performed after the user-supplied code module finishes execution may be referred to as "post-functionality". A step may have pre-functionality and/or post-functionality, or neither. The term "control functionality" may be used to collectively refer to the pre-functionality and post-functionality of a step.

It is noted that in one embodiment, not all steps of a test executive sequence must call a user-supplied code module. For example, the test executive software may provide some step types that primarily affect various aspects of sequence execution and are not designed to call user-supplied code modules.

As a test executive sequence is executed, various results may be generated. In one embodiment the test executive engine 220 may be operable to automatically collect the results, e.g., may store the results in one or more data structures. In various embodiments, the results may be generated or structured in any of various ways. For example, in one embodiment, there may be one or more results for the unit under test (UUT) as a whole, as well as results for individual steps in the sequence. The results may vary in data type as well.

Test Executive Steps

As described above, a test executive sequence comprises and defines an ordering for a plurality of test executive steps. A test executive step can do many things, such as initializing an instrument, performing a complex test, or making a decision that affects the flow of execution in a test executive sequence. Steps may perform these actions through several types of mechanisms, including jumping to another step, executing an expression, calling a sub-sequence, or calling a user-supplied code module.

Steps may have custom properties which the user can set, e.g., by interacting with a dialog box or other graphical user interface for the step as described above. For steps that call user-supplied code modules, custom step properties may be useful for storing parameters to pass to the user-supplied code module for the step. They may also serve as locations for the user-supplied code module to store its results. The test executive API may be used to access the values of custom step properties from user-supplied code modules.

As described above, in one embodiment not all steps call user-supplied code modules. Some steps may perform standard actions that the user configures using a GUI panel or dialog box. In this case, custom step properties may be useful for storing configuration settings that the user specifies.

Built-In Step Properties

As discussed above, in one embodiment test executive steps in a test executive sequence may have a number of built-in properties or parameters that the user can specify or configure. In one embodiment, built-in step properties may include properties such as:

"Preconditions" that allow the user to specify the conditions that must be true for the test executive engine 220 to execute the step during the normal flow of execution in a sequence.

"Load/Unload Options" that allow the user to specify when the test executive software loads and unloads the code modules or subsequences that each step invokes.

"Run Mode" that allows a step to be skipped or forced to pass or fail without executing the step module.

"Record Results" that allows the user to specify whether the test executive software collects the results of the step.

"Step Failure Causes Sequence Failure" that allows the user to specify whether the test executive software sets the status of the test executive sequence to "Failed" when the status of the step is "Failed".

"Ignore Run-Time Errors" that allows the user to specify whether the test executive sequence continues execution normally after the step even though a run-time error occurs in the step.

"Post Actions" that allows the user to specify the execution of callbacks or jump to other steps after executing the step, depending on the pass/fail status of the step or any custom condition.

"Loop" options that cause a single step to execute multiple times before executing the next step. The user can specify the conditions under which to terminate the loop. The user can also specify whether to collect results for each loop iteration, for the loop as a whole, or for both.

"Pre Expression" that allows the user to specify an expression to be evaluated before executing the step module.

"Post Expression" that allows the user to specify an expression to be evaluated after executing the step module.

"Status Expression" that allows the user to specify an expression to use to set the value of a "status" property of the step automatically.

Figure 6:
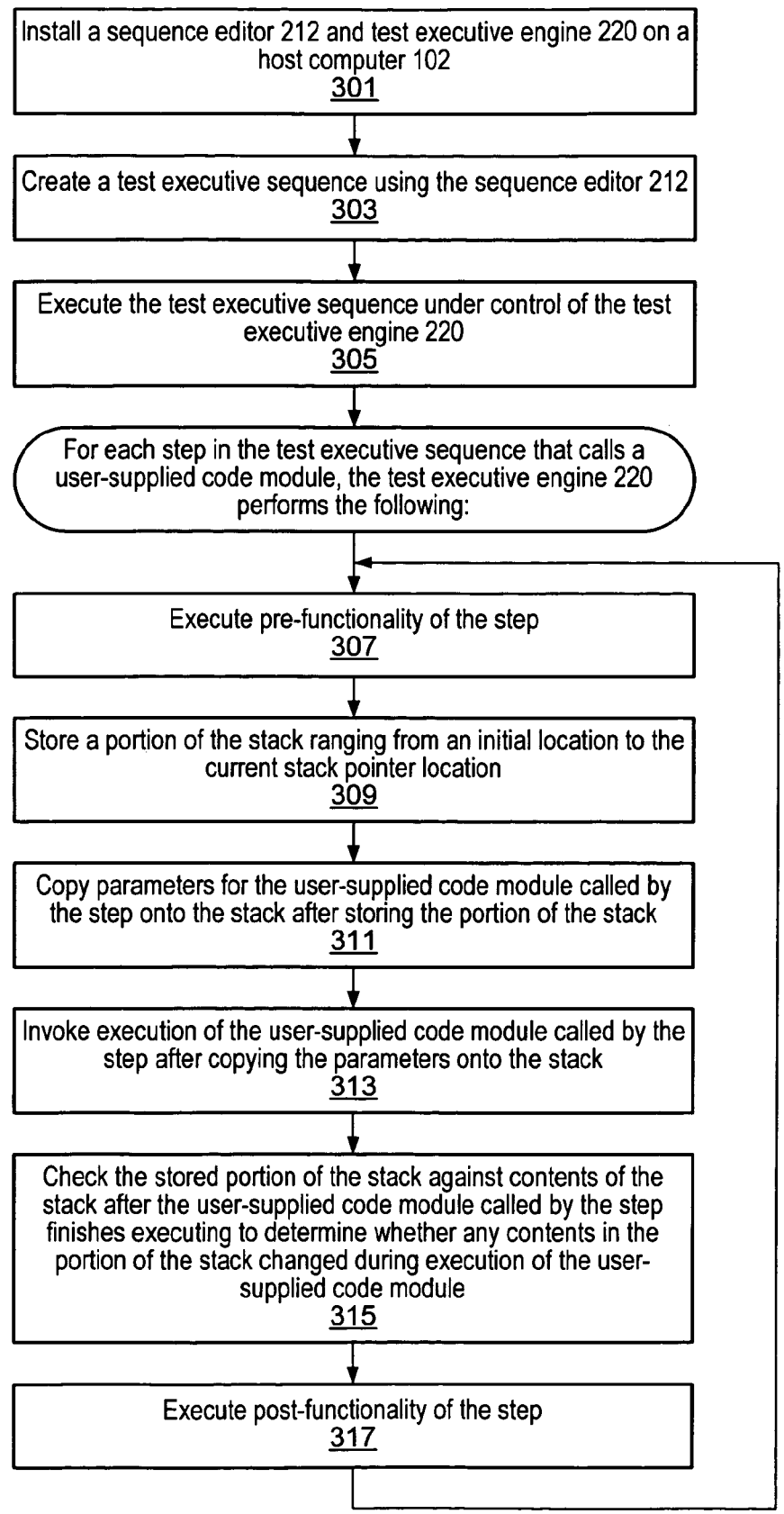
FIG. 6 is a flowchart diagram illustrating one embodiment of a method for automatically detecting stack corruption errors caused by user-supplied code modules that are called by steps of a test executive sequence.

FIG. 6—Automatic Stack Corruption Detection for User-Supplied Code Modules

As discussed above, the test executive engine 220 and user-supplied code modules that are called by steps of a test executive sequence may share a common stack during execution of the test executive sequence. A user-supplied code module can corrupt the stack by writing into portions of the stack that it is not supposed to write into. For example, if a user-supplied code module called by a step in the test executive sequence contains a bug that causes it to write into memory locations outside its own stack frame then it may corrupt data in stack frames of the test executive engine 220. This may cause a crash or other problem when executing the test executive sequence.

FIG. 6 is a flowchart diagram illustrating one embodiment of a method for automatically detecting stack corruption errors caused by user-supplied code modules that are called by steps of a test executive sequence. It is noted that FIG. 6 illustrates a representative embodiment, and alternative embodiments are contemplated. Also, various elements may be combined, omitted, or performed in different orders.

In 301, a test executive application may be installed on a computer system, such as the host computer 102 described above. As used herein, installing the test executive application on a computer system may include enabling the computer system to execute the test executive application. For example, one or more executable files associated with the test executive application or providing access to the test executive application may be installed on the host computer 102. The test executive application may include a sequence editor 212 and a test executive engine 220, as described above.

In 303, a test executive sequence may be created using the test executive application installed in 301. For example, the test executive sequence may be created using the sequence editor 212 of the test executive application, as described above. Creating the test executive sequence may comprise including a plurality of test executive steps in the test executive sequence in response to user input to the sequence editor 212, as described above. The user may also configure each of the steps, e.g., by interacting with a GUI panel or dialog box for each step to set various properties. As described above, at least a subset of the steps in the test executive sequence may call user-supplied code modules. For example, for each step that calls a user-supplied code module, the user may interact with a GUI panel to specify the user-supplied code module to call.

In various embodiments the test executive sequence may be operable to test any of various kinds of units under test (UUT) or physical systems. For example, steps in the test executive sequence may call user-supplied code modules that are operable to connect through one or more hardware devices or instruments to analyze, measure, or control a unit under test (UUT) or process 150, such as described above with reference to FIG. 1.

In 305, the test executive sequence may be executed under control of the test executive application, e.g., under control of the test executive engine 220 supplied by the test executive application. Executing the test executive sequence may comprise executing each of the steps in the test executive sequence. In various embodiments the test executive sequence may be executed to perform any of various kinds of tests on a unit under test (UUT) or process 150. For example, as described above with reference to FIG. 1, the host computer 102 may couple to one or more instruments, and various test executive steps in the test executive sequence may call user-supplied code modules that are operable to connect through the one or more instruments to analyze, measure, or control the unit under test (UUT) or process 150.

FIG. 6 indicates several operations that the test executive engine 220 may perform when executing each step in the test executive sequence that calls a user-supplied code module. As described above, in one embodiment a step may have "pre-functionality" that is implemented by the test executive engine 220, i.e., functionality to be performed before a user-supplied code module called by the step is executed. In 307 the test executive engine 220 may execute the pre-functionality of the step. In another embodiment the step may not have pre-functionality, and 307 may not be performed.

In 309 the test executive engine 220 may store a portion of the stack ranging from an initial location to the current stack pointer location. The portion of the stack which is stored in 309 may later be checked for corruption after the user-supplied code module called by the step has executed, as described below. In various embodiments, the portion of the stack may be stored in any of various locations or types of memory. In one embodiment the portion of the stack may be stored in a heap. For example, a block of memory may be dynamically allocated from the heap, and contents of the portion of the stack may be written into the allocated memory block. In another embodiment the portion of the stack may be stored on non-volatile memory, e.g., on a hard drive.

As noted, the portion of the stack which is stored may range from an initial location in the stack to the current stack pointer location (i.e., from the initial location to the location of the stack pointer when 309 is performed). In various embodiments, the initial location may be determined in any desired way. In one embodiment the test executive engine 220 may be executed in a thread T, and the test executive software may set the initial location to be a location of the stack pointer when the thread T begins execution. In other words, when the thread T first starts execution, the thread T may be operable to record the location of the stack pointer at that time, and this location may later be used as the initial location from which to measure the portion of the stack in 309. Thus, in this embodiment the portion of the stack which is stored may effectively include all stack data associated with the test executive engine 220, as of the time when 309 is performed. In this embodiment the initial location may be determined once at startup time of the thread T and may be used as the initial location when 309 is performed for each step in the test executive sequence that calls a user-supplied code module.

In another embodiment the beginning of the stack (i.e., the top of the stack according to the convention used herein) may be used as the initial location from which to measure the portion of the stack in 309. Thus, in this embodiment the entire portion of the stack that is in use at the time 309 is performed may be stored.

In another embodiment the test executive engine 220 may be operable to store a fixed-size portion of the stack in 309. For example, the test executive engine 220 may simply store N bytes of the stack, e.g., as measured from the current stack pointer location. Thus, in this embodiment the initial location may be determined by subtracting a fixed value from the current stack pointer location.

In other embodiments the initial stack location to use in 309 may be determined in any other desired way. In one embodiment the test executive engine 220 may be operable to determine the initial stack location using different techniques, and the user may be able to specify options affecting which technique to use. For example, as described above the sequence editor 212 may provide a graphical user interface allowing the user to specify options or parameters associated with stack corruption detection.

In one embodiment, a limit may be set on the size of the stack portion to store in 309. For example, the stack portion may be measured from an initial location as described above, but if the resulting stack portion is greater than a maximum number of bytes M then the test executive engine 220 may only store M bytes of the stack, e.g., as measured from the current stack pointer location.

Referring again to FIG. 6, in 311 the test executive engine 220 may copy parameters for the user-supplied code module called by the step (if the module takes any parameters) onto the stack after storing the portion of the stack in 309. As discussed above, the user-supplied code module may receive its parameter values on the stack. However, since the user-supplied code module may legitimately modify or write into its own parameters, the parameters may not be stored along with the stack portion that is stored in 309. Thus, the parameters may not be copied onto the stack until after the stack portion has been stored in 309. (In another embodiment the parameters may be copied onto the stack before the stack portion is stored, but the portion of the stack to store may be measured from the location where the stack pointer was before the parameters were copied onto the stack.)

In 313, the test executive engine 220 may invoke execution of the user-supplied code module called by the step. For example, where the user-supplied code module comprises a function in a DLL, the test executive engine 220 may invoke the function. As another example, where the user-supplied code module comprises a method of an ActiveX object, the test executive engine 220 may invoke the method. As another example, where the user-supplied code module comprises a graphical program, the test executive engine 220 may invoke execution of the graphical program. In other embodiments the test executive engine 220 may perform any of various other actions to invoke execution of the user-supplied code module, depending on the implementation of the module.

After the user-supplied code module finishes executing, the test executive engine 220 may check the portion of the stack that was stored in 309 against current contents of the actual stack to determine whether any contents in the portion of the stack were changed during execution of the user-supplied code module. In other words, current contents of the actual stack may be checked against the contents that were previously stored in 309, where the range of locations checked is the same range which was stored in 309. If the user-supplied code module did not write into a higher stack frame outside its own stack frame then the test executive engine 220 should find that the stored contents are the same as the actual current contents for the range of the stack that is checked, i.e., should find that the stack has not been corrupted. However, if any stack contents within the checked range were changed then the stack was corrupted.

If the test executive engine 220 finds that the stack was corrupted then the test executive engine 220 may be operable to report an error in response. In one embodiment the test executive engine 220 may stop execution of the test executive sequence and may display information on the display of the host computer 102 indicating that the user-supplied code module caused the stack to become corrupted. The test executive engine 220 may also display other information on the display, such as a stack location that was corrupted or may display the corrupted contents. In another embodiment the test executive engine 220 may continue executing the test executive sequence but may log the error, e.g., may log the error in a test results report for the test executive sequence, in a file, or in a database, etc.

In another embodiment, instead of storing actual stack contents before invoking execution of the user-supplied code module called by the step, the test executive engine 220 may store a checksum based on contents of a portion of the stack. After the user-supplied code module finishes executing, the test executive engine 220 may use the checksum to verify that the stack portion was not altered, e.g., by computing a new checksum based on the current contents of the same stack portion and verifying that the new checksum is the same as the stored checksum. A difference in the checksums may indicate that the stack was corrupted by the user-supplied code module. This embodiment may enable the test executive sequence to be executed faster and may require less memory since actual stack contents are not stored. However, in the event that the test executive engine 220 determines that the stack was corrupted, the test executive engine 220 may not be able to provide the user with details regarding the stack corruption, such as the specific memory location(s) that was corrupted or the contents of the corrupted location(s).

As described above, in one embodiment a step may have "post-functionality" that is implemented by the test executive engine 220, i.e., functionality to be performed after a user-supplied code module called by the step is executed. In 317 the test executive engine 220 may execute the post-functionality of the step. In another embodiment the step may not have post-functionality, and 317 may not be performed.

The above-described method of automatic stack corruption detection for user-supplied code modules called by steps of a test executive sequence may benefit users by informing them of bugs in their code modules of which they were not aware or by helping them to track down the source of a problem encountered during execution of the test executive sequence. It is noted that the above-described method of stack corruption detection would not work for an arbitrary system in which code modules can legitimately change data located in higher stack frames. In other words, the method depends on the test executive system having the property that user-supplied code modules are only allowed to modify stack data within their own stack frame.

It is noted that in other embodiments the method may also be applied to systems other than test executive systems to detect stack corruption detection by certain code modules, if the systems have the property that the code modules are only allowed to modify stack data within their own stack frame.

It is also noted that in one embodiment the method may still be utilized to detect stack corruption for certain user-supplied code modules in a test executive system even if user-supplied code modules are allowed to modify data in higher stack frames. For example, the above-described technique of stack corruption detection may not be performed by default for every step that calls a user-supplied code module, but the user may be able to enable the stack corruption detection for certain steps which he knows call user-supplied code modules that should not modify stack data outside their own stack frame.

In one embodiment the test executive engine 220 may be operable to execute the test executive sequence in different modes, e.g., in either a debug mode or a production mode. In one embodiment the action taken in response to discovering that a user-supplied code module called by a step in the sequence caused a stack corruption error may depend on which mode the test executive sequence is executed in. For example, if the test executive sequence is executed in debug mode then the test executive engine 220 may stop execution of the test executive sequence immediately in response to discovering the error. If the test executive sequence is executed in production mode then the test executive engine 220 may continue executing the test executive sequence but may log the error. In one embodiment the user may be able to specify desired behavior to take in response to discovering a stack corruption error caused by a user-supplied code module. For example, the test executive software may provide a GUI panel with various options that the user can set to specify desired behavior related to discovering and handling stack corruption errors.

In one embodiment, the test executive engine 220 may be configured to perform stack corruption checking when the test executive sequence is executed in debug mode but not when the test executive sequence is executed in production mode. Executing the test executive sequence without performing the stack corruption checking may increase execution performance of the test executive sequence. In one embodiment the user may be able to turn stack corruption checking on and off as desired (either for the entire test executive sequence or for individual steps in the test executive sequence), or the user may specify that stack corruption checking should only be performed when executing the test executive sequence in certain execution modes, e.g., in debug mode. For example, the user may interact with a GUI panel to set these options.

Figure 7:
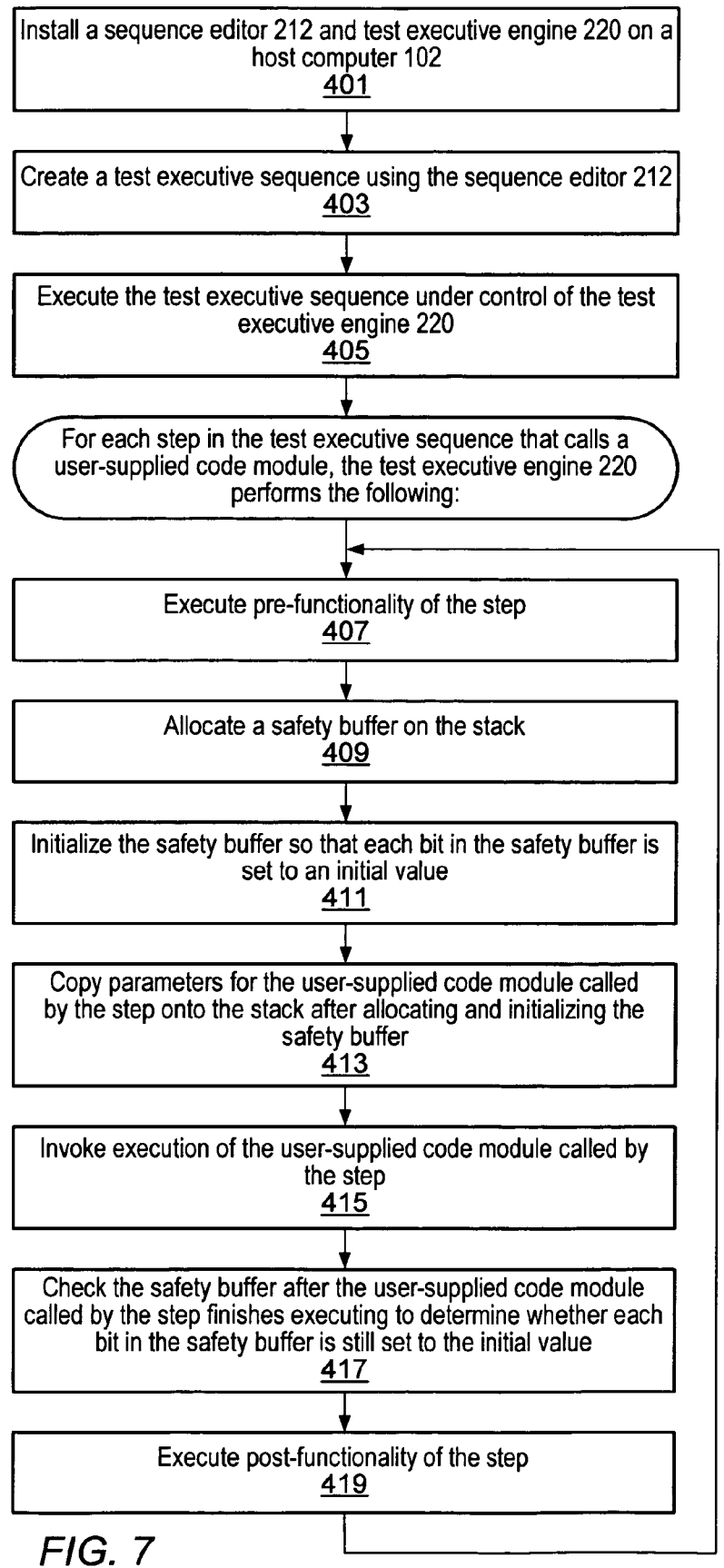
FIG. 7 is a flowchart diagram illustrating one embodiment of a method for utilizing stack safety buffers, e.g., to avoid stack corruption problems caused by user-supplied code modules that are called by steps of a test executive sequence.

FIG. 7—Stack Safety Buffers for User-Supplied Code Modules

As discussed above, a user-supplied code module called by a step in a test executive sequence can also corrupt the stack if a prototype that a user specifies for the user-supplied code module called does not match the module's actual prototype. For example, if the user-supplied code module expects to receive a buffer parameter on the stack and the test executive engine does not pass the buffer because the buffer parameter was not specified in the prototype which the user provided for the user-supplied code module, then the user-supplied code module may corrupt data in stack frames of the test executive engine 220 when attempting to write into the buffer. This may cause a crash or other problem when executing the test executive sequence.

FIG. 7 is a flowchart diagram illustrating one embodiment of a method for utilizing stack safety buffers, e.g., to avoid stack corruption problems caused by prototype mismatches for user-supplied code modules that are called by steps of a test executive sequence. It is noted that FIG. 7 illustrates a representative embodiment, and alternative embodiments are contemplated. Also, various elements may be combined, omitted, or performed in different orders.

In 401, a test executive application may be installed on a computer system, e.g., a host computer 102, similarly as described above with reference to 301 of FIG. 6. The test executive application may include a sequence editor 212 and a test executive engine 220, as described above.

In 403, a test executive sequence may be created using the test executive application installed in 401, similarly as described above with reference to 303 of FIG. 6. For example, the test executive sequence may be created using the sequence editor 212 of the test executive application, as described above. Creating the test executive sequence may comprise including a plurality of test executive steps in the test executive sequence in response to user input to the sequence editor 212, as described above. The user may also configure each of the steps, e.g., by interacting with a GUI panel or dialog box for each step to set various properties.

As described above, at least a subset of the steps in the test executive sequence may call user-supplied code modules. For example, for each step that calls a user-supplied code module, the user may interact with a GUI panel to specify the user-supplied code module to call. The user may also specify or provide a reference to a prototype for each user-supplied code module. Each prototype may specify a signature or calling interface for the respective user-supplied code module, such as the number of parameters to pass to the module and the data types and order for the parameters. As described below, the test executive engine 220 may utilize the prototype specified by the user to determine one or more parameters to pass to the user-supplied code module when the user-supplied code module is invoked during execution of the test executive sequence.

In 405, the test executive sequence may be executed under control of the test executive application, e.g., under control of the test executive engine 220 supplied by the test executive application. Executing the test executive sequence may comprise the test executive engine 220 executing each of the steps in the test executive sequence, similarly as described above with reference to 305 of FIG. 6.

For each step in the test executive sequence that calls a user-supplied code module, FIG. 7 indicates several operations that the test executive engine 220 may perform when executing the step. As described above, in one embodiment a step may have "pre-functionality" that is implemented by the test executive engine 220, i.e., functionality to be performed before a user-supplied code module called by the step is executed. In 407 the test executive engine 220 may execute the pre-functionality of the step. In another embodiment the step may not have pre-functionality, and 407 may not be performed.

In 409 the test executive engine 220 may allocate or reserve a safety buffer on the stack. The safety buffer may simply comprise a portion of the stack that contains no functional information and is not intended to be used. For example, the test executive engine 220 may simply cause the stack pointer to be moved downward to reflect the allocation of the safety buffer. As described below, if the user-supplied code module called by the step writes beyond the bounds of its parameters on the stack then the safety buffer may be overwritten. Overwriting the safety buffer, which contains no important information, is preferable to overwriting important information on the stack.

In various embodiments a safety buffer of any length may be allocated on the stack. For example, the test executive engine 220 may be operable to allocate a safety buffer of N bytes. In one embodiment the test executive software, e.g., the sequence editor 212, may allow the user to specify the number of bytes to allocate for the safety buffer.

As indicated in 411, in one embodiment the test executive engine 220 may initialize the safety buffer so that each bit in the safety buffer is set to an initial value. Initializing the safety buffer may enable the test executive engine 220 to check whether any bit in the safety buffer was overwritten by the user-supplied code module after the user-supplied code module finishes execution, as described below.

In one embodiment each bit in the safety buffer may be initialized to the same value. For example, each bit in the safety buffer may be set to 0, or each bit in the safety buffer may be set to 1. In another embodiment a pattern or sequence of bits may be used to initialize the safety buffer. If the length of the pattern is shorter than the length of the safety buffer then the pattern may be repeated over the length of the safety buffer. In one embodiment the user may be able to specify the value(s) used to initialize the safety buffer, e.g., may specify either a single value (0 or 1) or a pattern or sequence of bits.

Initializing the safety buffer to a pattern or sequence of bits may enable the test executive engine 220 to detect safety buffer overwrites that would not be detected if each bit in the safety buffer were initialized to the same value. For example, if each bit were initialized to 0 then an overwrite of the safety buffer by the user-supplied code module would not be detected if the module caused only 0 values to be written into the safety buffer. However, if a pattern or sequence of bits is used to initialize the safety buffer then it is less likely that the user-supplied code module would overwrite the safety buffer using the same pattern or sequence of bits.

In 413 the test executive engine 220 may copy or allocate one or more parameters for the user-supplied code module called by the step onto the stack after allocating and possibly initializing the safety buffer. Thus, the safety buffer may lie between stack data for the test executive engine 220 and the parameters for the user-supplied code module. The test executive engine 220 may utilize the prototype specified by the user for the user-supplied code module to determine what parameters to copy onto the stack, e.g., to determine the number of parameters, their sizes, etc.

In 415, the test executive engine 220 may invoke execution of the user-supplied code module called by the step, similarly as described above with reference to 313 of FIG. 6. The user-supplied code module may execute to perform any functionality and may possibly write into one or more of its parameters on the stack. As noted above, it is possible that there is a mismatch between the parameters actually expected by the user-supplied code module and the parameters that are passed to the user-supplied code module on the stack by the test executive engine 220. For example, the test executive engine 220 may pass one or more parameters to the user-supplied code module based on the prototype specified for the user-supplied code module when the test executive sequence was configured, but the specified prototype may not match the user-supplied code module's actual prototype, e.g., due to an error by the user in specifying the prototype or due to a subsequent change in the user-supplied code module. Such a mismatch may cause the user-supplied code module to write beyond the bounds of its parameters on the stack. It is also possible the user-supplied code module contains a bug which causes it to write beyond the bounds of its parameters on the stack. If the user-supplied code module writes beyond the bounds of its parameters on the stack then the safety buffer may be overwritten instead of important stack data, as described above.

As indicated in 417, in one embodiment the test executive engine 220 may check the safety buffer after the user-supplied code module called by the step finishes executing to determine whether each bit in the safety buffer is still set to the initial value to which it was initialized in 411. If the user-supplied code module did not write into the safety buffer then the test executive engine 220 should find that no bit in the safety buffer was changed from when it was initialized.

If the test executive engine 220 finds that the safety buffer was changed by the user-supplied code module then the test executive engine 220 may be operable to report an error in response. In one embodiment the test executive engine 220 may stop execution of the test executive sequence and may display information on the display of the host computer 102 indicating that the user-supplied code module wrote beyond the bounds of its parameters on the stack. The test executive engine 220 may also display other information on the display, such as the data in the portion of the safety buffer that was overwritten. In one embodiment the test executive engine 220 may also inform the user that the problem may have been caused by a mismatch between the prototype that was specified for the user-supplied code module called by the step and the module's actual prototype and may possibly display the prototype that was specified. In another embodiment the test executive engine 220 may continue executing the test executive sequence but may log the error, e.g., may log the error in a test results report for the test executive sequence, in a file, or in a database, etc.

In one embodiment the test executive engine 220 may be operable to execute the test executive sequence in different modes, e.g., in either a debug mode or a production mode. In one embodiment the action taken in response to discovering that the user-supplied code module called by the step caused a safety buffer to be overwritten may depend on which mode the test executive sequence is executed in, similarly as described above with reference to FIG. 6. Also, in one embodiment, the test executive engine 220 may be configured to utilize stack safety buffers for overwrite protection when the test executive sequence is executed in debug mode but not when the test executive sequence is executed in production mode.

As described above, in one embodiment the step may have "post-functionality" that is implemented by the test executive engine 220, i.e., functionality to be performed after the user-supplied code module called by the step is executed. In 419 the test executive engine 220 may execute the post-functionality of the step. In another embodiment the step may not have post-functionality, and 419 may not be performed.

In an alternative embodiment, 411 (initializing the safety buffer) and 417 (checking the safety buffer for changes) may not be performed. Thus, if the user-supplied code module writes beyond the bounds of its parameters into the safety buffer then this may not be detected by the test executive engine 220. However, the presence of the safety buffer on the stack may still prevent the overwrite from causing a crash or other serious problem when executing the test executive sequence.

Figure 8:
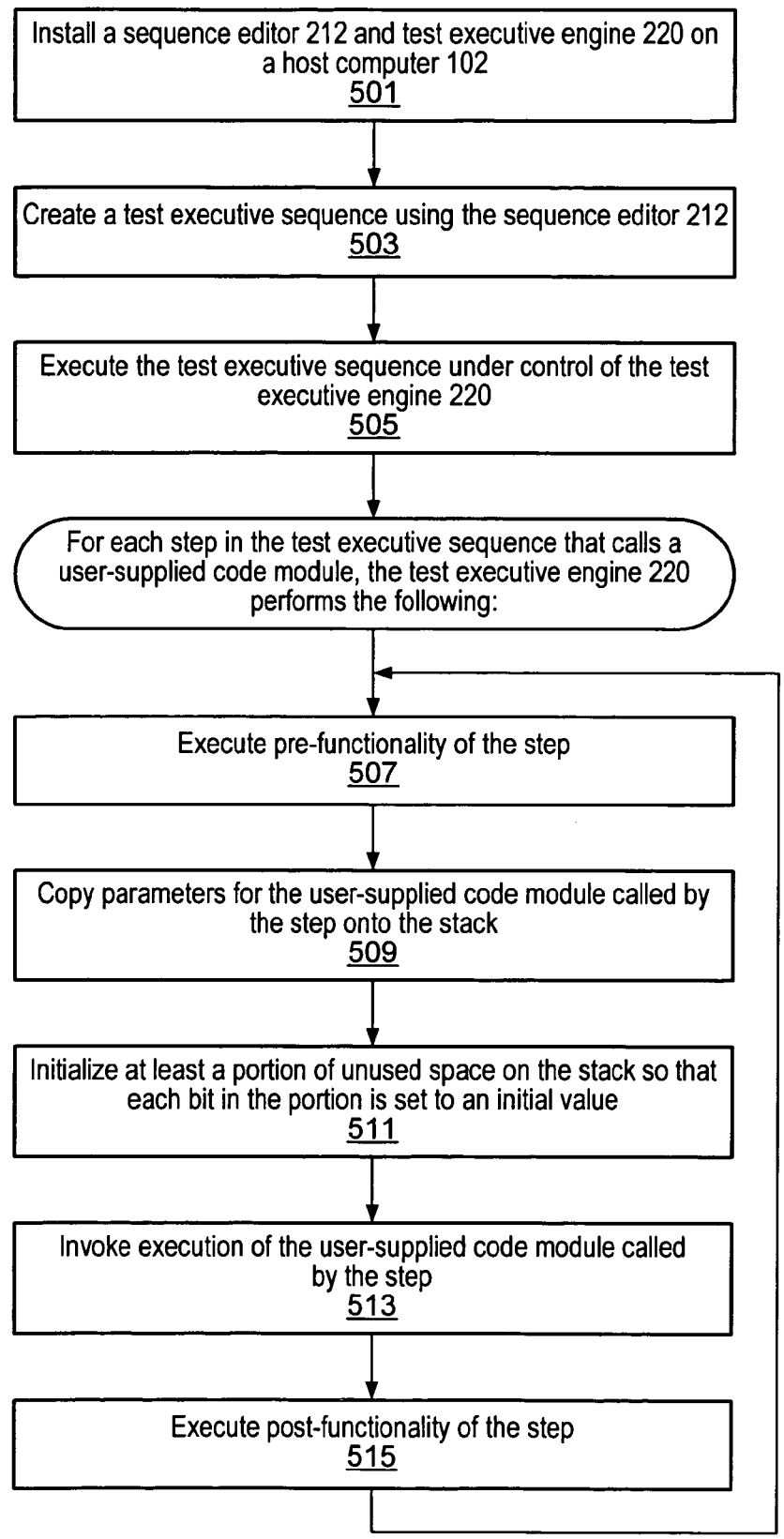
FIG. 8 is a flowchart diagram illustrating one embodiment of a method for aiding users in determining whether user-supplied code modules called by steps of a test executive sequence contain uninitialized local variable bugs.

FIG. 8—Increased Determinism for Uninitialized Local Variable Bugs in User-Supplied Code Modules In addition to problems associated with corrupting stack data such as described above with reference to FIGS. 6 and 7, user-supplied code modules that are called by steps of a test executive sequence may also contain other types of bugs. For example, user-supplied code modules often have uninitialized local variable bugs. If a user-supplied code module attempts to use a local variable whose value has not yet been initialized then the variable may contain random data, which may cause the user-supplied code module to crash or function incorrectly, or in some cases may cause the user-supplied code module to corrupt data belonging to the test executive engine 220.

FIG. 8 is a flowchart diagram illustrating one embodiment of a method for aiding users in determining whether user-supplied code modules called by steps of a test executive sequence contain uninitialized local variable bugs. It is noted that FIG. 8 illustrates a representative embodiment, and alternative embodiments are contemplated. Also, various elements may be combined, omitted, or performed in different orders.

In 501, a test executive application may be installed on a computer system, e.g., a host computer 102, similarly as described above with reference to 301 of FIG. 6. The test executive application may include a sequence editor 212 and a test executive engine 220, as described above.

In 503, a test executive sequence may be created using the test executive application installed in 501, similarly as described above with reference to 303 of FIG. 6. For example, the test executive sequence may be created using the sequence editor 212 of the test executive application, as described above. Creating the test executive sequence may comprise including a plurality of test executive steps in the test executive sequence in response to user input to the sequence editor 212, as described above. The user may also configure each of the steps, e.g., by interacting with a GUI panel or dialog box for each step to set various properties. As described above, at least a subset of the steps in the test executive sequence may be configured to call user-supplied code modules. For example, for each step that calls a user-supplied code module, the user may interact with a GUI panel to specify the user-supplied code module to call.

In 505, the test executive sequence may be executed under control of the test executive application, e.g., under control of the test executive engine 220 supplied by the test executive application. Executing the test executive sequence may comprise the test executive engine 220 executing each of the steps in the test executive sequence, similarly as described above with reference to 305 of FIG. 6.

For each step in the test executive sequence that calls a user-supplied code module, FIG. 8 indicates several operations that the test executive engine 220 may perform when executing the step. As described above, in one embodiment a step may have "pre-functionality" that is implemented by the test executive engine 220, i.e., functionality to be performed before a user-supplied code module called by the step is executed. In 507 the test executive engine 220 may execute the pre-functionality of the step. In another embodiment the step may not have pre-functionality, and 507 may not be performed.

In 509 the test executive engine 220 may copy or allocate one or more parameters for the user-supplied code module called by the step onto the stack. The test executive engine 220 may utilize a prototype specified for the user-supplied code module to determine what parameters to copy onto the stack, e.g., to determine the number of parameters, their sizes, etc.

In 511 the test executive engine 220 may initialize at least a portion of unused space on the stack so that each bit in the portion is set to an initial value. When the user-supplied code module called by the step is subsequently executed, the user-supplied code module may utilize one or more local variables. These local variables may be stored on the stack and may be stored within the portion of the stack that is initialized in 511 (provided that the portion of the stack that is initialized in 511 is large enough to hold all the local variables).

Local variables usually need to be initialized to an appropriate value before their value is used. However, users sometimes forget to initialize one or more of the local variables in their user-supplied code modules. In this case the content of the uninitialized local variable(s) depends on previous usage of the stack. Since this effectively constitutes random data, the behavior of the user-supplied code module which uses the uninitialized local variable can vary. Problem symptoms caused by the uninitialized local variable can be hard to reproduce and isolate. They can also appear or disappear depending on other factors, such as whether compiler build settings used to produce the user-supplied code module are set to debug settings or release settings. Thus, by initializing the stack in 511, uninitialized local variables in the user-supplied code module called by the step may be filled with a known value. This may ensure that the user-supplied code module behaves the same each time it is executed, thus greatly decreasing the user's debugging effort.

In one embodiment, initializing the portion of unused space on the stack in 511 may comprise setting each bit in the portion to the same value. For example, each bit in the stack portion may be set to 0, or each bit in the stack portion may be set to 1. In another embodiment a pattern or sequence of bits may be used to initialize the stack portion. If the length of the pattern is shorter than the length of the stack portion then the pattern may be repeated over the length of the stack portion. In one embodiment, each byte in the stack portion may be set to a particular bit pattern. In one embodiment the user may be able to specify the value(s) used to initialize the stack portion, e.g., may specify either a single value (0 or 1) to which to set each bit, a byte value for each byte in the stack portion, or a pattern or sequence of bits of an arbitrary length to copy into the stack portion.

In various embodiments any size portion of unused space on the stack may be initialized in 511. Typically, a portion of stack space on the order of a few kilobytes may be initialized. However, in other embodiments, smaller or larger portions may also be initialized, as desired. In one embodiment, all unused space on the stack may be initialized in 511, e.g., a portion ranging from the stack pointer to the bottom end of the stack. In one embodiment the user may specify an amount of unused stack space to initialize, e.g., by interacting with a graphical user interface of the sequence editor 212 when creating the test executive sequence in 503. The user may be able to specify an amount of unused stack space to initialize for every step that calls a user-supplied code module and/or may specify an amount of unused stack space to initialize for an individual step in the test executive sequence. The user may also be able to interact with the graphical user interface to enable or disable the stack initialization for the entire test executive sequence or for individual steps in the test executive sequence.

In 513 the test executive engine 220 may invoke execution of the user-supplied code module called by the step, similarly as described above with reference to 313 of FIG. 6. The user-supplied code module may execute to perform any functionality and may possibly use one or more local variables that are stored on the stack, as described above.

As described above, in one embodiment the step may have "post-functionality" that is implemented by the test executive engine 220, i.e., functionality to be performed after the user-supplied code module called by the step is executed. In 515 the test executive engine 220 may execute the post-functionality of the step. In another embodiment the step may not have post-functionality, and 515 may not be performed.

Thus, where a user-supplied code module called by a step of a test executive sequence has an uninitialized local variable, the above-described method may cause the user-supplied code module to behave consistently by filling the local variable with a known value. In an embodiment in which the user can specify the value to which to initialize the portion of unused stack space, the user may be able to vary the initialization value or fill pattern to check the effect that this has on the execution of the user-supplied code module. This may help the user to debug the user-supplied code module. For example, the user may specify a first initial value to which to set each bit in the portion of unused space on the stack. As one example, the user may specify that each bit in the portion of unused space on the stack should be set to 0, or may specify that each byte in the portion of unused space on the stack should be set to a first byte value. The test executive sequence may then be executed a first time using the first initial value. The user may then change the initial value to which each bit in the portion of unused space on the stack is set. For example, the user may specify that each bit in the portion of unused space on the stack should be set to 1, or may specify that each byte in the portion of unused space on the stack should be set to a second byte value. The test executive sequence may then be executed a second time using the second initial value. The user may observe the difference in the behavior of the test executive sequence when the initial values are changed, which may aid the user in determining whether a user-supplied code module called by a step in the test executive sequence has an uninitialized local variable bug.

In one embodiment the test executive engine 220 may be operable to execute the test executive sequence in different modes, e.g., in either a debug mode or a production mode. In one embodiment, the test executive engine 220 may be configured to initialize a portion of unused stack space before invoking execution of a user-supplied code module called by a step in the test executive sequence when the test executive sequence is executed in debug mode but not when the test executive sequence is executed in production mode. Also, the user may be able to enable or disable the initialization as desired, either for the test executive sequence as a whole or for individual steps in the test executive sequence.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium storing program instructions executable to:
   include a plurality of test executive steps in a test executive sequence in response to user input;
   configure each respective step of the plurality of test executive steps to call a respective user-supplied code module in response to user input;
   determine an initial location on a stack before execution of the test executive sequence begins; and
   execute the test executive sequence, wherein said executing comprises executing each respective step of the plurality of test executive steps after determining the initial location;
   wherein executing each respective step comprises:
      storing a first portion of the stack ranging from the initial location to a current stack pointer location;
      invoking execution of the respective user-supplied code module called by the respective step; and
      checking the stored portion of the stack against contents of the stack after the respective user-supplied code module called by the respective step finishes executing to determine whether the first portion of the stack changed during execution of the respective user-supplied code module called by the respective step;
   wherein for each respective step of the plurality of test executive steps, said storing the first portion of the stack comprises storing a respective portion of the stack beginning at the same initial location.

2. The computer-readable memory medium of claim 1, wherein the program instructions are further executable to report an error in response to determining that the first portion of the stack changed during execution of a user-supplied code module called by a test executive step.

3. The computer-readable memory medium of claim 1, wherein the program instructions are further executable to stop execution of the test executive sequence in response to determining that the first portion of the stack changed during execution of a user-supplied code module called by a test executive step.

4. The computer-readable memory medium of claim 1, wherein for each respective step of the plurality of test executive steps:
   said storing the first portion of the stack comprises storing a portion of the stack that the respective user-supplied code module called by the respective step is not supposed to change;
   wherein said checking the stored portion of the stack against contents of the stack after the respective user-supplied code module called by the respective step finishes executing comprises checking whether the respective user-supplied code module called by the respective step wrote data to the portion of the stack that the respective user-supplied code module is not supposed to change.

5. The computer-readable memory medium of claim 1, wherein for each respective step of the plurality of test executive steps, said executing the respective step further comprises:
   copying one or more parameters to pass to the respective user-supplied code module called by the respective step onto the stack after said storing the first portion of the stack;
   wherein the respective user-supplied code module called by the respective step is allowed to access the one or more parameters on the stack but not the first portion of the stack.

6. The computer-readable memory medium of claim 1, wherein determining the initial location on the stack comprises determining a location of a stack pointer for the stack before the execution of the test executive sequence begins.

7. The computer-readable memory medium of claim 1, wherein said determining the initial location on the stack is performed only once.

8. The computer-readable memory medium of claim 1, wherein the initial location represents a location of a stack pointer for the stack when a thread begins execution;
   wherein said determining the initial location is performed when the thread begins execution.

9. The computer-readable memory medium of claim 1, wherein said storing the first portion of the stack comprises storing the first portion of the stack in a heap.

10. The computer-readable memory medium of claim 1, wherein one or more of the plurality of test executive steps have pre-functionality, wherein the pre-functionality for each respective step of the one or more steps comprises functionality to be performed before invoking execution of the respective user-supplied code module called by the respective step;
   wherein for each respective step that has pre-functionality, said executing the respective step further comprises executing the pre-functionality of the respective step before said invoking execution of the respective user-supplied code module called by the respective step.

11. The computer-readable memory medium of claim 1,
wherein one or more of the plurality of test executive steps have post-functionality, wherein the post-functionality for each respective step of the one or more steps comprises functionality to be performed after the respective user-supplied code module called by the respective step finishes executing;
wherein for each respective step that has post-functionality, said executing the respective step further comprises executing the post-functionality of the respective step after the respective user-supplied code module called by the respective step finishes executing.

12. The computer-readable memory medium of claim 1,
wherein the program instructions are further executable to display a graphical user interface for creating the test executive sequence;
wherein said including the plurality of test executive steps in the test executive sequence is performed in response to user input received to the graphical user interface requesting inclusion of the test executive steps in the test executive sequence.

13. The computer-readable memory medium of claim 1,
wherein for each respective step of the plurality of test executive steps, the program instructions are further executable to display a graphical user interface for configuring the respective step;
wherein for each respective step of the plurality of test executive steps, the respective step is configured to call a respective user-supplied code module in response to user input received to the graphical user interface for configuring the respective step, wherein the user input specifies the respective user-supplied code module.

14. The computer-readable memory medium of claim 1,
wherein said executing the test executive sequence comprises executing the test executive sequence under control of a test executive engine;
wherein for each respective step of the plurality of test executive steps, the test executive engine is operable to perform said storing the first portion of the stack, invoking execution of the respective user-supplied code module called by the respective step, and checking the stored portion of the stack against contents of the stack after the respective user-supplied code module called by the respective step finishes executing.

15. A computer-implemented method comprising:
including a plurality of test executive steps in a test executive sequence in response to user input;
configuring each respective step of the plurality of test executive steps to call a respective user-supplied code module in response to user input;
determining an initial location on a stack before execution of the test executive sequence begins; and
executing the test executive sequence, wherein said executing comprises executing each respective step of the plurality of test executive steps after determining the initial location;
wherein each respective comprises:
storing a first portion of the stack ranging from the initial location to a current stack pointer location;
invoking execution of the respective user-supplied code module called by the respective step; and
checking the stored portion of the stack against contents of the stack after the respective user-supplied code module called by the respective step finishes executing to determine whether the first portion of the stack changed during execution of the respective user-supplied code module called by the respective step;

wherein for each respective step of the plurality of test executive steps, said storing the first portion of the stack comprises storing a respective portion of the stack beginning at the same initial location.

16. The method of claim 15, wherein for each respective step of the plurality of test executive steps:
said storing the first portion of the stack comprises storing a portion of the stack that the respective user-supplied code module called by the respective step is not supposed to change;
wherein said checking the stored portion of the stack against contents of the stack after the respective user-supplied code module called by the respective step finishes executing comprises checking whether the respective user-supplied code module called by the respective step wrote data to the portion of the stack that the respective user-supplied code module is not supposed to change.

17. The method of claim 15, wherein for each respective step of the plurality of test executive steps, said executing the respective step further comprises:
copying one or more parameters to pass to the respective user-supplied code module called by the respective step onto the stack after said storing the first portion of the stack;
wherein the respective user-supplied code module called by the respective step is allowed to access the one or more parameters on the stack but not the first portion of the stack.

18. The method of claim 15,
wherein said storing the first portion of the stack comprises storing the first portion of the stack in a heap.

19. The method of claim 15,
wherein one or more of the plurality of test executive steps have pre-functionality, wherein the pre-functionality for each respective step of the one or more steps comprises functionality to be performed before invoking execution of the respective user-supplied code module called by the respective step;
wherein for each respective step that has pre-functionality, said executing the respective step further comprises executing the pre-functionality of the respective step before said invoking execution of the respective user-supplied code module called by the respective step.

20. The method of claim 15,
wherein one or more of the plurality of test executive steps have post-functionality, wherein the post-functionality for each respective step of the one or more steps comprises functionality to be performed after the respective user-supplied code module called by the respective step finishes executing;
wherein for each respective step that has post-functionality, said executing the respective step further comprises executing the post-functionality of the respective step after the respective user-supplied code module called by the respective step finishes executing.

21. The method of claim 15,
wherein said executing the test executive sequence comprises executing the test executive sequence under control of a test executive engine;
wherein for each respective step of the plurality of test executive steps, the test executive engine is operable to perform said storing the first portion of the stack, invoking execution of the respective user-supplied code module called by the respective step, and checking the stored portion of the stack against contents of the stack after the respective user-supplied code module called by the respective step finishes executing.

22. A system comprising:
a sequence editor;
a test executive engine;
a host computer configured to execute the sequence editor and the test executive engine; and
a unit under test (UUT) coupled to the host computer;
wherein the host computer is configured to execute the sequence editor to create a test executive sequence for testing the UUT, wherein said creating the test executive sequence comprises including a plurality of test executive steps in the test executive sequence in response to user input to the sequence editor and configuring each respective step of the plurality of test executive steps to call a respective user-supplied code module in response to user input to the sequence editor;
wherein the host computer is further configured to determine an initial location on a stack before execution of the test executive sequence begins;
wherein the host computer is further configured to execute the test executive engine, wherein the test executive engine is configured to control execution of the test executive sequence, wherein said controlling execution of the test executive sequence comprises causing each respective step of the plurality of test executive steps to be executed on the host computer after determining the initial location;
wherein for each respective step, the test executive engine is configured to:
store a first portion of the stack ranging from the initial location to a current stack pointer location;
invoke execution of the respective user-supplied code module called by the respective step; and
check the stored portion of the stack against contents of the stack after the respective user-supplied code module called by the respective step finishes executing to determine whether the first portion of the stack changed during execution of the respective user-supplied code module called by the respective step;
wherein for each respective step of the plurality of test executive steps, said storing the first portion of the stack comprises storing a respective portion of the stack beginning at the same initial location.

23. A computer-readable memory medium comprising program instructions executable to:
include a plurality of test executive steps in a test executive sequence in response to user input;
configure each of the test executive steps to call a user-supplied code module in response to user input; and
execute the test executive sequence, wherein said executing comprises executing each of the test executive steps in the test executive sequence;
wherein for each test executive step in the test executive sequence, said executing the test executive step comprises;
allocating a safety buffer on a call stack to prevent the user-supplied code module called by the test executive step from corrupting the call stack;
initializing the safety buffer so that each bit in the safety buffer is set to an initial value;
copying one or more parameters for the user-supplied code module called by the test executive step onto the call stack after said allocating the safety buffer; and
invoking execution of the user-supplied code module called by the test executive step.

24. The computer-readable memory medium of claim 23, wherein the program instructions are further executable to:
receive user input specifying a prototype for each user-supplied code module that is called by a test executive step in the test executive sequence;
wherein said receiving user input specifying the prototypes for the user-supplied code modules includes receiving user input specifying a first prototype for a first user-supplied code module called by a first test executive step, wherein the specified first prototype does not match an actual prototype of the first user-supplied code module;
wherein executing the first test executive step comprises;
allocating a safety buffer on the call stack;
initializing the safety buffer so that each bit in the safety buffer is set to an initial value;
copying one or more parameters according to the specified first prototype onto the call stack after allocating the safety buffer; and
invoking execution of the first user-supplied code module called by the first test executive step;
wherein said allocating the safety buffer on the call stack prevents the first user-supplied code module from corrupting the call stack.

25. The computer-readable memory medium of claim 24, wherein the first user-supplied code module writes onto the call stack beyond bounds of the one or more parameters copied onto the call stack according to the specified first prototype;
wherein said allocating the safety buffer on the call stack prevents said writing beyond the bounds of the one or more parameters from corrupting the call stack.

26. The computer-readable memory medium of claim 23, wherein the test executive sequence includes a first test executive step that calls a first user-supplied code module;
wherein the first user-supplied code module writes onto the call stack beyond bounds of the one or more parameters for the first user-supplied code module copied onto the call stack;
wherein said allocating the safety buffer on the call stack prevents said writing beyond the bounds of the one or more parameters from corrupting the call stack.

27. The computer-readable memory medium of claim 26, wherein the program instructions are further executable to:
receive user input specifying a first prototype for the first user-supplied code module called by the first test executive step, wherein the specified first prototype does not match an actual prototype of the first user-supplied code module;
wherein said writing beyond the bounds of the one or more parameters is caused by the mismatch between the specified first prototype and the actual prototype of the first user-supplied code module.

28. The computer-readable memory medium of claim 23, wherein for each test executive step in the test executive sequence, said executing the test executive step further comprises checking the safety buffer after the user-supplied code module called by the test executive step finishes executing to determine whether each bit in the safety buffer is still set to the initial value.

29. The computer-readable memory medium of claim 28, wherein the program instructions are further executable to report an error in response to determining that a user-supplied code module called by a test executive step caused a bit in a safety buffer to be set to a value other than the initial value.

30. The computer-readable memory medium of claim 28, wherein the program instructions are further executable to stop execution of the test executive sequence in response to determining that a user-supplied code module called by a test executive step caused a bit in a safety buffer to be set to a value other than the initial value.

31. The computer-readable memory medium of claim 23, wherein said initializing the safety buffer so that each bit in the safety buffer is set to an initial value comprises initializing the safety buffer so that each bit in the safety buffer is set to zero.

32. The computer-readable memory medium of claim 23, wherein one or more test executive steps in the test executive sequence have pre-functionality, wherein the pre-functionality for each of the one or more test executive steps comprises functionality to be performed before invoking execution of the user-supplied code module called by the test executive step;

wherein for each test executive step in the test executive sequence that has pre-functionality, said executing the test executive step further comprises executing the pre-functionality of the step before said invoking execution of the user-supplied code module called by the test executive step.

33. The computer-readable memory medium of claim 23, wherein one or more test executive steps in the test executive sequence have post-functionality, wherein the post-functionality for each of the one or more test executive steps comprises functionality to be performed after the user-supplied code module called by the test executive step finishes executing;

wherein for each test executive step in the test executive sequence that has post-functionality, said executing the test executive step further comprises executing the post-functionality of the step after the user-supplied code module called by the test executive step finishes executing.

34. The computer-readable memory medium of claim 23, wherein the program instructions are further executable to display a graphical user interface for creating the test executive sequence;

wherein said including the plurality of test executive steps in the test executive sequence is performed in response to user input received to the graphical user interface requesting inclusion of the test executive steps in the test executive sequence.

35. The computer-readable memory medium of claim 23, wherein for each test executive step in the test executive sequence, the program instructions are further executable to display a graphical user interface for configuring the test executive step;

wherein for each test executive step in the test executive sequence, the test executive step is configured to call a user-supplied code module in response to user input received to the graphical user interface for configuring the test executive step, wherein the user input specifies the user-supplied code module.

36. The computer-readable memory medium of claim 23, wherein said executing the test executive sequence comprises executing the test executive sequence under control of a test executive engine;

wherein for each test executive step in the test executive sequence, the test executive engine is operable to perform said allocating the safety buffer, initializing the safety buffer, copying the one or more parameters onto the call stack, and invoking execution of the user-supplied code module called by the test executive step.

37. The computer-readable memory medium of claim 23, wherein for a first test executive step in the test executive sequence, said invoking execution of the user-supplied code module called by the first test executive step comprises one of:

calling a function in a DLL;
invoking a method of an ActiveX object; or
invoking execution of a graphical program.

38. A computer-implemented method comprising:

including a plurality of test executive steps in a test executive sequence in response to user input;
configuring each of the test executive steps to call a user-supplied code module in response to user input; and
executing the test executive sequence, wherein said executing comprises executing each of the test executive steps in the test executive sequence;
wherein for each test executive step in the test executive sequence, said executing the test executive step comprises:
allocating a safety buffer on a call stack to prevent the user-supplied code module called by the test executive step from corrupting the call stack;
initializing the safety buffer so that each bit in the safety buffer is set to an initial value;
copying one or more parameters for the user-supplied code module called by the test executive step onto the call stack after said allocating the safety buffer; and
invoking execution of the user-supplied code module called by the test executive step.

39. The method of claim 38, further comprising:

receiving user input specifying a prototype for each user-supplied code module that is called by a test executive step in the test executive sequence;
wherein said receiving user input specifying the prototypes for the user-supplied code modules includes receiving user input specifying a first prototype for a first user-supplied module called by a first test executive step, wherein the specified first prototype does not match an actual prototype of the first user-supplied code module;
wherein executing the first test executive step comprises:
allocating a safety buffer on the call stack;
initializing the safety buffer so that each bit in the safety buffer is set to an initial value;
copying one or more parameters according to the specified first prototype onto the call stack after allocating the safety buffer; and
invoking execution of the first user-supplied code module called by the first test executive step;
wherein said allocating the safety buffer on the call stack prevents the first user-supplied code module from corrupting the call stack.

40. The method of claim 39, wherein the first user-supplied code module writes onto the call stack beyond bounds of the one or more parameters copied onto the call stack according to the specified first prototype;
wherein said allocating the safety buffer on the call stack prevents said writing beyond the bounds of the one or more parameters from corrupting the call stack.

41. The method of claim 38, wherein the test executive sequence includes a first test executive step that calls a first user-supplied code module;
wherein the first user-supplied code module writes onto the call stack beyond bounds of the one or more parameters for the first user-supplied code module copied onto the call stack;

wherein said allocating the safety buffer on the call stack prevents said writing beyond the bounds of the one or more parameters from corrupting the call stack.

42. The method of claim 38,
wherein for each test executive step in the test executive sequence, said executing the test executive step further comprises checking the safety buffer after the user-supplied code module called by the test executive step finishes executing to determine whether each bit in the safety buffer is still set to the initial value.

43. The method of claim 38,
wherein said initializing the safety buffer so that each bit in the safety buffer is set to an initial value comprises initializing the safety buffer so that each bit in the safety buffer is set to zero.

44. The method of claim 38,
wherein one or more test executive steps in the test executive sequence have pre-functionality, wherein the pre-functionality for each of the one or more test executive steps comprises functionality to be performed before invoking execution of the user-supplied code module called by the test executive step;
wherein for each test executive step in the test executive sequence that has pre-functionality, said executing the test executive step further comprises executing the pre-functionality of the step before said invoking execution of the user-supplied code module called by the test executive step.

45. The method of claim 38,
wherein one or more test executive steps in the test executive sequence have post-functionality, wherein the post-functionality for each of the one or more test executive steps comprises functionality to be performed after the user-supplied code module called by the test executive step finishes executing;
wherein for each test executive step in the test executive sequence that has post-functionality, said executing the test executive step further comprises executing the post-functionality of the step after the user-supplied code module called by the test executive step finishes executing.

46. The method of claim 38,
wherein said executing the test executive sequence comprises executing the test executive sequence under control of a test executive engine;
wherein for each test executive step in the test executive sequence, the test executive engine is operable to perform said allocating the safety buffer, initializing the safety buffer, copying the one or more parameters onto the call stack, and invoking execution of the user-supplied code module called by the test executive step.

47. A system comprising:
a sequence editor;
a test executive engine;
a host computer configured to execute the sequence editor and the test executive engine; and
a unit under test (UTJT) coupled to the host computer;
wherein the host computer is configured to execute the sequence editor to create a test executive sequence for testing the UUT, wherein said creating the test executive sequence comprises including a plurality of test executive steps in the test executive sequence in response to user input to the sequence editor and configuring each of the test executive steps to call a user-supplied code module in response to user input to the sequence editor;
wherein the host computer is further configured to execute the test executive engine, wherein the test executive engine is configured to control execution of the test executive sequence, wherein said controlling execution of the test executive sequence comprises causing each of the test executive steps in the test executive sequence to be executed on the host computer;
wherein for each test executive step in the test executive sequence, the test executive engine is configured to:
allocate a safety buffer on a call stack to prevent the user-supplied code module called by the test executive step from corrupting the call stack;
initialize the safety buffer so that each bit in the safety buffer is set to an initial value;
copy one or more parameters for the user-supplied code module called by the test executive step onto the call stack after said allocating the safety buffer; and
invoke execution of the user-supplied code module called by the test executive step.

48. A computer-readable memory medium comprising program instructions executable to:
include a plurality of test executive steps in a test executive sequence in response to user input;
configure each of the test executive steps to call a user-supplied code module in response to user input;
receive user input specifying an amount of stack space to initialize before invoking execution of the user-supplied code modules called by the test executive steps; and
execute the test executive sequence, wherein said executing comprises executing each of the test executive steps in the test executive sequence;
wherein for each test executive step in the test executive sequence, said executing the test executive step comprises:
initializing at least a portion of unused space on a stack so that each bit in the portion is set to an initial value, wherein initializing the at least a portion of unused space on the stack comprises initializing the specified amount of stack space; and
invoking execution of the user-supplied code module called by the test executive step after said initializing the portion of unused space on the stack;
wherein the user-supplied code module called by the test executive step utilizes the stack for storage of one or more local variables used in the user-supplied code module;
wherein said initializing the portion of unused space on the stack aids in determining whether the user-supplied code module called by the test executive step has an uninitialized local variable bug.

49. The computer-readable memory medium of claim 48,
wherein said initializing the at least a portion of unused space on the stack comprises initializing all unused space on the stack.

50. The computer-readable memory medium of claim 48,
wherein the program instructions are further executable to receive user input specifying the initial value to which to set each bit in the portion of unused space on the stack;
wherein said initializing the portion of unused space on the stack comprises setting each bit in the portion to the specified initial value.

51. The computer-readable memory medium of claim 50,
wherein said receiving user input specifying the initial value to which to set each bit in the portion of unused space on the stack comprises receiving user input specifying to set each bit in the portion of unused space on the stack to either 0 or 1.

52. The computer-readable memory medium of claim 50,
wherein the program instructions are executable to:

receive user input specifying a first initial value to which to set each bit in the portion of unused space on the stack;

execute the test executive sequence a first time using the first initial value;

receive user input specifying a second initial value to which to set each bit in the portion of unused space on the stack, wherein the second initial value is different than the first initial value;

execute the test executive sequence a second time using the second initial value;

wherein executing the test executive sequence multiple times using different initial values for the portion of unused space on the stack aids in determining whether a user-supplied code module called by a test executive step in the test executive sequence has an uninitialized local variable bug.

53. The computer-readable memory medium of claim 48, wherein for each test executive step in the test executive sequence, said executing the test executive step further comprises copying one or more parameters for the user-supplied code module called by the test executive step onto the stack.

54. The computer-readable memory medium of claim 48, wherein one or more test executive steps in the test executive sequence have pre-functionality, wherein the pre-functionality for each of the one or more test executive steps comprises functionality to be performed before invoking execution of the user-supplied code module called by the test executive step;

wherein for each test executive step in the test executive sequence that has pre-functionality, said executing the test executive step further comprises executing the pre-functionality of the step before said invoking execution of the user-supplied code module called by the test executive step.

55. The computer-readable memory medium of claim 48, wherein one or more test executive steps in the test executive sequence have post-functionality, wherein the post-functionality for each of the one or more test executive steps comprises functionality to be performed after the user-supplied code module called by the test executive step finishes executing;

wherein for each test executive step in the test executive sequence that has post-functionality, said executing the test executive step further comprises executing the post-functionality of the step after the user-supplied code module called by the test executive step finishes executing.

56. The computer-readable memory medium of claim 48, wherein the program instructions are further executable to display a graphical user interface for creating the test executive sequence;

wherein said including the plurality of test executive steps in the test executive sequence is performed in response to user input received to the graphical user interface requesting inclusion of the test executive steps in the test executive sequence.

57. The computer-readable memory medium of claim 48, wherein for each test executive step in the test executive sequence, the program instructions are further executable to display a graphical user interface for configuring the test executive step;

wherein for each test executive step in the test executive sequence, the test executive step is configured to call a user-supplied code module in response to user input received to the graphical user interface for configuring the test executive step, wherein the user input specifies the user-supplied code module.

58. The computer-readable memory medium of claim 48, wherein said executing the test executive sequence comprises executing the test executive sequence under control of a test executive engine;

wherein for each test executive step in the test executive sequence, the test executive engine is operable to perform said initializing and said invoking execution of the user-supplied code module called by the test executive step.

59. A computer-implemented method comprising:

including a plurality of test executive steps in a test executive sequence in response to user input;

configuring each of the test executive steps to call a user-supplied code module in response to user input;

receiving user input specifying an amount of stack space to initialize before invoking execution of the user-supplied code modules called by the test executive steps; and executing the test executive sequence, wherein said executing comprises executing each of the test executive steps in the test executive sequence;

wherein for each test executive step in the test executive sequence, said executing the test executive step comprises:

initializing at least a portion of unused space on a stack so that each bit in the portion is set to an initial value, wherein initializing the at least a portion of unused space on the stack comprises initializing the specified amount of stack space; and invoking execution of the user-supplied code module called by the test executive step after said initializing the portion of unused space on the stack;

wherein the user-supplied code module called by the test executive step utilizes the stack for storage of one or more local variables used in the user-supplied code module;

wherein said initializing the portion of unused space on the stack aids in determining whether the user-supplied code module called by the test executive step has an uninitialized local variable bug.

60. The method of claim 59, wherein said initializing the at least a portion of unused space on the stack comprises initializing all unused space on the stack.

61. The method of claim 59, further comprising:

receiving user input specifying the initial value to which to set each bit in the portion of unused space on the stack;

wherein said initializing the portion of unused space on the stack comprises setting each bit in the portion to the specified initial value.

62. The method of claim 61, wherein said receiving user input specifying the initial value to which to set each bit in the portion of unused space on the stack comprises receiving user input specifying to set each bit in the portion of unused space on the stack to either 0 or 1.

63. The method of claim 61, wherein the method comprises:

receiving user input specifying a first initial value to which to set each bit in the portion of unused space on the stack;

executing the test executive sequence a first time using the first initial value;

receiving user input specifying a second initial value to which to set each bit in the portion of unused space on the stack, wherein the second initial value is different than the first initial value; and executing the test executive sequence a second time using the second initial value;
wherein executing the test executive sequence multiple times using different initial values for the portion of unused space on the stack aids in determining whether a user-supplied code module called by a test executive step in the test executive sequence has an uninitialized local variable bug.

64. The method of claim 59,
wherein one or more test executive steps in the test executive sequence have pre-functionality, wherein the pre-functionality for each of the one or more test executive steps comprises functionality to be performed before invoking execution of the user-supplied code module called by the test executive step;
wherein for each test executive step in the test executive sequence that has pre-functionality, said executing the test executive step further comprises executing the pre-functionality of the step before said invoking execution of the user-supplied code module called by the test executive step.

65. The method of claim 59,
wherein one or more test executive steps in the test executive sequence have post-functionality, wherein the post-functionality for each of the one or more test executive steps comprises functionality to be performed after the user-supplied code module called by the test executive step finishes executing;
wherein for each test executive step in the test executive sequence that has post-functionality, said executing the test executive step further comprises executing the post-functionality of the step after the user-supplied code module called by the test executive step finishes executing.

66. The method of claim 59,
wherein said executing the test executive sequence comprises executing the test executive sequence under control of a test executive engine;
wherein for each test executive step in the test executive sequence, the test executive engine is operable to perform said initializing and said invoking execution of the user-supplied code module called by the test executive step.

67. A system comprising:
a sequence editor;
a test executive engine;
a host computer configured to execute the sequence editor and the test executive engine; and
a unit under test (UUT) coupled to the host computer;
wherein the host computer is configured to execute the sequence editor to create a test executive sequence for testing the UUT, wherein said creating the test executive sequence comprises including a plurality of test executive steps in the test executive sequence in response to user input to the sequence editor and configuring each of the test executive steps to call a user-supplied code module in response to user input to the sequence editor;
wherein the host computer is further configured to execute the sequence editor to receive user input specifying an amount of stack space to initialize before invoking execution of the user-supplied code modules called by the test executive steps;
wherein the host computer is further configured to execute the test executive engine, wherein the test executive engine is configured to control execution of the test executive sequence, wherein said controlling execution of the test executive sequence comprises causing each of the test executive steps in the test executive sequence to be executed on the host computer;
wherein for each test executive step in the test executive sequence, the test executive engine is configured to:
initialize at least a portion of unused space on a stack so that each bit in the portion is set to an initial value, wherein initializing the at least a portion of unused space on the stack comprises initializing the specified amount of stack space; and
invoke execution of the user-supplied code module called by the test executive step after said initializing the portion of unused space on the stack;
wherein the user-supplied code module called by the test executive step utilizes the stack for storage of one or more local variables used in the user-supplied code module;
wherein said initializing the portion of unused space on the stack aids in determining whether the user-supplied code module called by the test executive step has an uninitialized local variable bug.

68. A computer-readable memory medium storing program instructions executable to:
include a plurality of test executive steps in a test executive sequence in response to user input;
configure each respective step of the plurality of test executive steps to call a respective user-supplied code module in response to user input;
determine an initial location on a stack; and
execute the test executive sequence, wherein said executing comprises executing each respective step of the plurality of test executive steps after determining the initial location;
wherein executing each respective step comprises:
storing a first portion of the stack ranging from the initial location to a current stack pointer location;
invoking execution of the respective user-supplied code module called by the respective step; and
checking the stored portion of the stack against contents of the stack after the respective user-supplied code module called by the respective step finishes executing to determine whether the first portion of the stack changed during execution of the respective user-supplied code module called by the respective step;
wherein for each respective step of the plurality of test executive steps, said storing the first portion of the stack comprises storing a respective portion of the stack beginning at the same initial location;
wherein said determining the initial location on the stack is performed only once.

69. A computer-implemented method comprising:
including a plurality of test executive steps in a test executive sequence in response to user input;
configuring each respective step of the plurality of test executive steps to call a respective user-supplied code module in response to user input;
determining an initial location on a stack; and
executing the test executive sequence, wherein said executing comprises executing each respective step of the plurality of test executive steps after determining the initial location;
wherein each respective comprises:
storing a first portion of the stack ranging from the initial location to a current stack pointer location;
invoking execution of the respective user-supplied code module called by the respective step; and
checking the stored portion of the stack against contents of the stack after the respective user-supplied code module called by the respective step finishes executing to determine whether the first portion of the stack changed during execution of the respective user-supplied code module called by the respective step;

wherein for each respective step of the plurality of test executive steps, said storing the first portion of the stack comprises storing a respective portion of the stack beginning at the same initial location;

wherein said determining the initial location on the stack is performed only once.

70. A computer-readable memory medium comprising program instructions executable to:

include a plurality of test executive steps in a test executive sequence in response to user input;

configure each of the test executive steps to call a user-supplied code module in response to user input;

execute the test executive sequence, wherein said executing comprises executing each of the test executive steps in the test executive sequence;

wherein for each test executive step in the test executive sequence, said executing the test executive step comprises:

initializing all unused space on a stack so that each bit in the unused space is set to an initial value; and invoking execution of the user-supplied code module called by the test executive step after said initializing the unused space on the stack;

wherein the user-supplied code module called by the test executive step utilizes the stack for storage of one or more local variables used in the user-supplied code module;

wherein said initializing the unused space on the stack aids in determining whether the user-supplied code module called by the test executive step has an uninitialized local variable bug.

71. A computer-readable memory medium comprising program instructions executable to:

include a plurality of test executive steps in a test executive sequence in response to user input;

configure each of the test executive steps to call a user-supplied code module in response to user input;

receive user input specifying an initial value for stack initialization; and execute the test executive sequence, wherein said executing comprises executing each of the test executive steps in the test executive sequence;

wherein for each test executive step in the test executive sequence, said executing the test executive step comprises:

initializing at least a portion of unused space on a stack so that each bit in the portion is set to the specified initial value; and invoking execution of the user-supplied code module called by the test executive step after said initializing the portion of unused space on the stack;

wherein the user-supplied code module called by the test executive step utilizes the stack for storage of one or more local variables used in the user-supplied code module;

wherein said initializing the portion of unused space on the stack aids in determining whether the user-supplied code module called by the test executive step has an uninitialized local variable bug.

72. A computer-implemented method comprising:

including a plurality of test executive steps in a test executive sequence in response to user input;

configuring each of the test executive steps to call a user-supplied code module in response to user input;

receiving user input specifying an initial value for stack initialization; and executing the test executive sequence, wherein said executing comprises executing each of the test executive steps in the test executive sequence;

wherein for each test executive step in the test executive sequence, said executing the test executive step comprises:

initializing at least a portion of unused space on a stack so that each bit in the portion is set to the specified initial value; and invoking execution of the user-supplied code module called by the test executive step after said initializing the portion of unused space on the stack;

wherein the user-supplied code module called by the test executive step utilizes the stack for storage of one or more local variables used in the user-supplied code module;

wherein said initializing the portion of unused space on the stack aids in determining whether the user-supplied code module called by the test executive step has an uninitialized local variable bug.

* * * * *

UNITED STATES PATENT AND TRADEMARK OFFICE
CERTIFICATE OF CORRECTION

PATENT NO. : 7,613,954 B2  Page 1 of 1
APPLICATION NO. : 11/107337
DATED : November 3, 2009
INVENTOR(S) : Grey et al.

It is certified that error appears in the above-identified patent and that said Letters Patent is hereby corrected as shown below:

Title Page and Col. 1 in the Title:

Please delete "TEST EXECUTIVE WITH STACK CORRUPTION DETECTION" and substitute -- TEST EXECUTIVE WITH STACK CORRUPTION DETECTION, STACK SAFETY BUFFERS, AND INCREASED DETERMINISM FOR UNINITIALIZED LOCAL VARIABLE BUGS --.

In the Claims:

Column 37
Line 57, please delete "a unit under test (UTJT) coupled" and substitute -- a unit under test (UUT) coupled --.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,613,954 B2 | Page 1 of 1 |
| APPLICATION NO. | : 11/107337 | |
| DATED | : November 3, 2009 | |
| INVENTOR(S) | : Grey et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Nineteenth Day of October, 2010

David J. Kappos
*Director of the United States Patent and Trademark Office*